US008281362B2

(12) United States Patent
Nagata et al.

(10) Patent No.: US 8,281,362 B2
(45) Date of Patent: Oct. 2, 2012

(54) VERIFICATION METHOD, VERIFICATION PROGRAM, RECORDING MEDIUM, INFORMATION PROCESSOR, AND INTEGRATED CIRCUIT

(75) Inventors: Minehisa Nagata, Hyogo (JP); Senichi Onoda, Osaka (JP); Toshihisa Nakano, Osaka (JP); Masaya Yamamoto, Arcadia, CA (US); Kaoru Murase, Nara (JP); Masayuki Kozuka, Osaka (JP); Tateo Oishi, Saitama (JP); Yoshikazu Takashima, Tokyo (JP); Takashi Yamanishi, Tokyo (JP); Yoshitomo Osawa, Kanagawa (JP); Jun Yonemitsu, Kanagawa (JP); Katsumi Muramatsu, Tokyo (JP)

(73) Assignee: Panasonic Corporation, Osaka (JP)

( * ) Notice: Subject to any disclaimer, the term of this patent is extended or adjusted under 35 U.S.C. 154(b) by 881 days.

(21) Appl. No.: 11/662,603

(22) PCT Filed: Jul. 12, 2006

(86) PCT No.: PCT/JP2006/313898
§ 371 (c)(1),
(2), (4) Date: May 31, 2007

(87) PCT Pub. No.: WO2007/007805
PCT Pub. Date: Jan. 18, 2007

(65) Prior Publication Data
US 2008/0046680 A1 Feb. 21, 2008

Related U.S. Application Data

(60) Provisional application No. 60/698,931, filed on Jul. 14, 2005.

(51) Int. Cl.
*G06F 17/30* (2006.01)

(52) U.S. Cl. ............... 726/2; 726/22; 713/150; 713/189
(58) Field of Classification Search ............... 726/2, 22; 713/150, 189, 193
See application file for complete search history.

(56) References Cited

U.S. PATENT DOCUMENTS
6,526,041 B1    2/2003  Shaffer et al.
(Continued)

FOREIGN PATENT DOCUMENTS
CN          1464688        12/2003
(Continued)

OTHER PUBLICATIONS

Hasegawa et al., "A Security Mechanism of Mobile Agents against Attack of Malicious Hosts", *Information Processing Society of Japan* (2001 second stage), 63rd National Convention, pp. 549-550, and English translation.

(Continued)

*Primary Examiner* — Jeffrey D Popham
*Assistant Examiner* — Gary Gracia
(74) *Attorney, Agent, or Firm* — Wenderoth, Lind & Ponack L.L.P.

(57) ABSTRACT

A virtual machine can be implemented by anyone because the interface and other information necessary for implementation are publicly available. Therefore, it is possible that by implementing the virtual machine illegitimately, programs run thereon on will be made to operate illegitimately instead of legitimately. A program compares secret information held by the virtual machine with verification information held by the program itself. The program thereby verifies whether the virtual machine that runs the program is implemented legitimately, and is able to reject an illegitimate virtual machine.

20 Claims, 12 Drawing Sheets

U.S. PATENT DOCUMENTS

| | | | | |
|---|---|---|---|---|
| 7,308,717 | B2* | 12/2007 | Koved et al. | 726/27 |
| 7,370,233 | B1* | 5/2008 | Sobel et al. | 714/15 |
| 2002/0116632 | A1* | 8/2002 | Itoh et al. | 713/200 |
| 2002/0184374 | A1* | 12/2002 | Morikawa | 709/229 |
| 2002/0194496 | A1* | 12/2002 | Griffin et al. | 713/200 |
| 2003/0120684 | A1* | 6/2003 | Zuili et al. | 707/200 |
| 2003/0126590 | A1* | 7/2003 | Burrows et al. | 717/154 |
| 2003/0156586 | A1* | 8/2003 | Lee et al. | 370/392 |
| 2004/0133794 | A1* | 7/2004 | Kocher et al. | 713/193 |
| 2004/0143551 | A1* | 7/2004 | Jong | 705/64 |
| 2004/0203384 | A1* | 10/2004 | Sugikawa et al. | 455/41.2 |
| 2004/0210652 | A1* | 10/2004 | Oyama et al. | 709/223 |
| 2004/0225880 | A1* | 11/2004 | Mizrah | 713/155 |
| 2005/0033972 | A1 | 2/2005 | Watson | |
| 2005/0049886 | A1* | 3/2005 | Grannan et al. | 705/1 |
| 2005/0114295 | A1* | 5/2005 | Takashima | 707/1 |
| 2005/0125552 | A1* | 6/2005 | Katayama | 709/232 |
| 2005/0138649 | A1* | 6/2005 | Schwabe | 719/328 |
| 2005/0198488 | A1* | 9/2005 | Sandland et al. | 713/150 |
| 2005/0204126 | A1* | 9/2005 | Watson | 713/150 |
| 2005/0235131 | A1* | 10/2005 | Ware | 711/203 |
| 2005/0283502 | A1* | 12/2005 | Heitner et al. | 707/200 |
| 2005/0289139 | A1* | 12/2005 | Takashima et al. | 707/5 |
| 2006/0059426 | A1* | 3/2006 | Ogikubo | 715/723 |
| 2006/0190987 | A1* | 8/2006 | Ohta et al. | 726/1 |
| 2006/0206675 | A1* | 9/2006 | Sato et al. | 711/161 |
| 2008/0031109 | A1* | 2/2008 | Takashima et al. | 369/47.53 |

FOREIGN PATENT DOCUMENTS

| | | |
|---|---|---|
| JP | 2000-295354 | 10/2000 |
| JP | 2001-306171 | 11/2001 |
| JP | 2005-182712 | 7/2005 |

OTHER PUBLICATIONS

Haruki et al., "Protecting Mobile Agents against Malicious Hosts Using Tamper Resistant Hardware", *Information Processing Society of Japan*, vol. 44, No. 6, pp. 1613-1624, Jun. 2003.

Haruki et al., "Protecting Mobile Agents against Malicious Hosts Using Tamper Resistant Hardware", *Information Processing Society of Japan*, vol. 44, No. 6, pp. 1613-1624, Jun. 2003 (partial English translation).

Shen et al., Xian-jun, "Security policies for mobile agent based on role-based access control," Department of Computer Science, Central China Normal University, Wuhan, China.

* cited by examiner

FIG.4

| ADDRESS (401) | VERIFICATION TIMING (402) | VERIFICATION VALUE (403) | VERIFICATION RULE (404) |
|---|---|---|---|
| 0x00ff0001 | WHEN MENU LIST IS DISPLAYED | 0x11 | EQUIVALENCE |
| | WHEN MENU 1 IS DISPLAYED | 0xed | EQUIVALENCE |
| | WHEN MENU 2 IS DISPLAYED | 0x16 | EQUIVALENCE |
| | WHEN MENU 3 IS DISPLAYED | 0x34 | EQUIVALENCE |
| | WHEN PLAYBACK STARTS | 0xf4 | EQUIVALENCE |
| 0x00eee002 | WHEN DISC IS INSERTED | UNSPECIFIED | CURRENT TIME ACQUISITION; STORAGE |
| | WHEN INITIAL MOVING IMAGE IS PLAYED BACK | UNSPECIFIED | CURRENT TIME ACQUISITION; CHECK FOR INCREASE IN VALUE; STORAGE |
| | WHEN CLIP PLAYBACK STARTS | UNSPECIFIED | CURRENT TIME ACQUISITION; CHECK FOR INCREASE IN VALUE; STORAGE |
| 0x00110044 ~ 0x001100ff | WHEN INITIAL MOVING IMAGE IS PLAYED BACK | UNSPECIFIED | INCLUSION OF VALUE EQUIVALENT TO TIME STAMP OF INDEX FILE |
| ... | | | |

FIG.5

| VIRTUAL MACHINE CODE IDENTIFYING INFORMATION (117) | ADDRESS (401) | VERIFICATION TIMING (402) | VERIFICATION VALUE (403) | VERIFICATION RULE (404) |
|---|---|---|---|---|
| 0x0011ff0000011001 | 0x00ff0001 | WHEN MENU 1 IS DISPLAYED | 0xed | EQUIVALENCE |
| | 0x00ff0001 | WHEN MENU 2 IS DISPLAYED | 0x16 | EQUIVALENCE |
| | 0x00ff0001 | WHEN MENU 3 IS DISPLAYED | 0x34 | EQUIVALENCE |
| | 0x00eee002 | WHEN DISC IS INSERTED | | CURRENT TIME ACQUISTION; STORAGE |
| | 0x00eee002 | WHEN CLIP FILE IS SWITCHED | | CURRENT TIME ACQUISTION; CHECK FOR INCREASE IN VALUE; STORAGE |
| | 0x00110044 ~ 0x001100ff | WHEN INITIAL MOVING IMAGE IS PLAYED BACK | UNSPECIFIED | INCLUSION OF VALUE EQUIVALENT TO TIME STAMP OF INDEX FILE |
| | 0x00aa0010 | WHEN DISC IS INSERTED | | RANDOM NUMBER GENERATION; STORAGE |
| 0x0022ee000050003 | 0x00aa0010 | WHEN PLAYBACK STARTS | | RANDOM NUMBER GENERATION; GIVE POSITIVE RESULT IF DIFFERENT FROM PREVIOUS VALUE; STORAGE |
| | 0x00aa0010 | WHEN A USER OPERATION IS RECEIVED | | RANDOM NUMBER GENERATION; GIVE POSITIVE RESULT IF DIFFERENT FROM PREVIOUS VALUE; STORAGE |
| ... | | | | |

500

VERIFICATION METHOD, VERIFICATION PROGRAM, RECORDING MEDIUM, INFORMATION PROCESSOR, AND INTEGRATED CIRCUIT

CROSS-REFERENCE TO RELATED APPLICATION

This application is a 371 National Stage application of PCT/JP2006/313898, filed Jul. 12, 2006, which claims priority to U.S. Provisional Application No. 60/698,931, filed Jul. 14, 2005, the entireties of which are incorporated herein by reference.

BACKGROUND OF THE INVENTION

I. Technical Field

The present invention relates to an apparatus that uses a virtual machine to execute programs, and in particular to a technique for judging legitimacy of a platform on which the virtual machine is implemented, and rejecting the platform if it is illegitimate.

II. Description of Related Art

In recent years, virtual machines have come to be used for running programs without depending on platforms such as the OS and the CPU. Virtual machines are generally software-implemented, and since the interface and other information necessary to implement the virtual machines are publicly available, the virtual machines can be implemented by anyone.

SUMMARY OF THE INVENTION

For this reason, by implementing a virtual machine maliciously, a program that operates thereon can be made to operate illegitimately rather than legitimately. If the program is, for example, one that protects the copyright of contents such as a movie, this can lead to an unauthorized playback of the contents.

In view of the above problem, the present invention aims to provide an information processing method that enables a program to verify that a virtual machine that runs the program is implemented legitimately.

In order to solve the above problem, the present invention provides a verification method used in an information processing device that executes processing relating to playback of contents by using a virtual machine included therein, the verification method comprising: a reading step of reading a verification program stored on a storage medium together with the contents; and a verifying step of verifying, by using the virtual machine executing the verification program, legitimacy of the information processing device including the virtual machine.

With the use of the above verification method, a verification program can verify whether a virtual machine that runs the verification program is implemented legitimately.

Also, the verifying step may comprise: an acquiring step of acquiring, as verification information, a value stored at a predetermined memory address in the information processing device; and a judging step of judging whether the information processing device is legitimate based on the acquired verification information.

According to the above verification method, verification of the information processing device is performed using the value stored at the predetermined memory address.

Therefore, the virtual machine cannot be implemented without knowledge of the memory address that stores the value used for verification. This can make it difficult for an illegitimate third party to implement an illegitimate virtual machine.

Also, the storage medium may further have stored thereon a playback-related program that is executed on the virtual machine and includes a processing procedure that relates to the playback of the contents, and the verification method may further comprise a suppressing unit operable to, if the information processing device is illegitimate, suppress the execution of the processing procedure.

This can make it impossible to play back contents in an illegitimate virtual machine.

Also, the contents may be transformed so as to be restored by executing a predetermined restoration processing, the processing procedure may include a procedure of restoring the transformed contents by executing the restoration processing, and the suppressing step may suppress the execution of the restoration processing.

This can make it impossible to execute restoration processing of contents in an illegitimate virtual machine in the case where the contents are transformed in order to protect copyrights thereof, for example.

Also, the verification information may be information that changes in accordance with a timing.

According to the above verification method, information that changes in accordance with a timing is used as the verification information. Therefore, even if an illegitimate analyst identifies the memory address that stores the verification information, it is difficult to identify a value shown by legitimate verification information.

Therefore, it is difficult for an illegitimate third party to illegitimately implement an execution environment in which verification by the verification program can be passed.

Also, the verification information may be information that relates to the contents that are played back.

According to the above verification method, the verification program verifies legitimacy of the information processing device based on the information that relates to the contents that are played back.

With this verification method, the verification program can verify whether the contents that are played back are contents to be used with the verification program.

Therefore, according to the above verification method, the following illegitimate act can be prevented for example: an illegitimate third party copies a legitimate verification program, and when another contents are played back, illegitimate verification is performed by loading a copy of the legitimate-verification program.

Also, the verification information may be information that depends on an execution environment including the virtual machine.

According to this, the verification program can verify whether the execution environment where the verification program is executed is an execution environment implemented by an illegitimate third party without knowledge of legitimate verification information.

Also, the storage medium may further have stored thereon one or more verification values and one or more verification rules in correspondence, the judging step may comprise a comparing step of comparing the verification information with one of the stored verification values based on one of the verification rules that corresponds to the verification value, and if a result of the comparison satisfies the verification rule, the judging step may judge that the information processing device is legitimate.

This can make it difficult for an illegitimate third party without knowledge of the verification value and the verification rule to implement an illegitimate virtual machine.

Also, the acquiring step may comprise a requesting step of making a request for a value stored at the predetermined memory address at a verification timing, the verification method may further comprise a returning step of reading the stored value in response to the request, and returning the read value as the verification information to the verification program, the acquiring step may acquire the returned value as the verification information, and the comparing step may perform the comparison using the acquired verification information.

Also, the storage medium may further have stored thereon the verification values and one or more verification timings in correspondence, the comparing step may perform the comparison using the verification information acquired at one of the verification timings, the verification value corresponding to the verification timing, and the verification rule corresponding to the verification timing, the judging step may further comprise: a repeating step of repeating execution of the comparing step at each of the verification timings; and a determining step of determining the information processing device as illegitimate if a count of negative results of the repetition is no less than a predetermined value.

According to the above verification method, if a count of negative results of the repetition is no less than the predetermined value, the information processing device is determined as illegitimate. Therefore, the verification accuracy can be increased.

Also, the storage medium may further have stored thereon the verification values and pieces of identifying information that each uniquely identifies the virtual machine in correspondence, and the comparing step may perform the comparison using one of the verification value corresponding to one piece of the identifying information identifying the virtual machine included in the information processing device.

According to this, verification can be performed using a verification value different depending on virtual machines.

Also, the storage medium may further have stored thereon one or more verification timings and one or more verification rules in correspondence, the information processing device may further comprise a storing unit that stores, as information for comparison, a value stored at the predetermined memory address at a predetermined timing, the acquiring step may acquire a value stored at the predetermined memory address at one of the verification timings, the judging step may comprise a comparing step of comparing the verification information with the stored information for comparison based on one of the verification rules that corresponds to the verification timing, and the judging step may perform the judgment based on a result of the comparison.

Also, the acquiring step may comprise a requesting step of making a request for the value stored at the verification timing, the verification method may further comprise a returning step of reading the stored value in response to the request, and returning the read value as the verification information to the verification program, the acquiring step may acquire the returned value as the verification information, and the comparing step may perform the comparison using the acquired verification information.

Also, the information processing device may further comprise a random number generating unit operable to generate a random number, the verification method may comprise a random number storing step of causing the random number generating unit to generate a random number at each of the verification timings, and store the generated random number at the predetermined address, the acquiring step may perform the acquisition of the verification information by reading the stored random number at the verification timing, and if the verification information differs from the comparison information in the comparison, the judging step may judge the information processing device as legitimate.

This can make it difficult for an illegitimate third party without knowledge of the implementation of the use of a random number for verification of legitimacy of the information processing device, to implement an illegitimate virtual machine.

Also, the random number generating unit may perform the generation based on information that depends on the execution environment including the virtual machine.

According to this, if there are different execution environments, the random number generating unit has a low possibility to generate the same random number in each execution environment.

Also, the information processing device may further comprise a clock unit operable to clock a time and write the time to the predetermined memory address, the storing unit may store the time written at the predetermined timing as the information for comparison, the acquiring step may perform the acquisition of the verification information by reading the written time at the verification timing, and if the time shown by the verification information is greater than the time shown by the information for comparison in the comparison, the judging step may judge the information processing device as legitimate.

This can make it difficult for an illegitimate third party without knowledge of implementation in which a time is used for verification of legitimacy of the information processing device to implement an illegitimate virtual machine.

Also, the present invention provides an information processing device that executes processing relating to playback of contents stored on a storage medium and includes therein a virtual machine, wherein the storage medium has stored thereon a verification program that verifies legitimacy of the information processing device by being executed on the virtual machine, and the information processing device comprises: a reading unit operable to read the verification program from the storage medium; a receiving unit operable to receive, from the verification program, a request for a value stored at the verification timing at a predetermined memory address in the information processing device; and a returning unit operable to, upon receiving the request, read the stored value and return the read value to the verification program.

Also, the present invention provides an integrated circuit implemented in an information processing device that executes processing relating to playback of contents stored on a storage medium and includes therein a virtual machine, wherein the storage medium has stored thereon a verification program that verifies legitimacy of the information processing device by being executed on the virtual machine, and the integrated circuit comprises: a reading unit operable to read the verification program from the storage medium; a receiving unit operable to receive, from the verification program, a request for a value stored at a predetermined memory address in the information processing device at the verification timing; and a returning unit operable to, upon receiving the request, read the stored value and return the read value to the verification program.

Also, the present invention provides a storage medium having stored thereon a verification program that executes processing relating to playback of contents and verifies legitimacy of an information processing device including therein a virtual machine, wherein the verification program comprises:

an acquiring step of acquiring, as verification information, a value stored at a predetermined memory address in the information processing device; and a judging step of judging whether the information processing device is legitimate based on the acquired verification information.

Also, the present invention provides a verification program that causes an information processing device including therein a virtual machine to verify legitimacy of the information processing device, the information processing device executing processing relating to playback of contents stored on a storage medium, the verification program comprising: an acquiring step of acquiring, as verification information, a value stored at a predetermined memory address in the information processing device; and a judging step of judging whether the information processing device is legitimate based on the acquired verification information.

As has been described, according to the present invention, an effect is obtained of providing an information processing method by which a program is able to verify that a virtual machine that runs the program is implemented legitimately.

BRIEF DESCRIPTION OF THE DRAWINGS

FIG. 4 is an example of the data structure of a verification rule in the first embodiment in the first embodiment;

FIG. 5 is an example of the data structure of verification rule table in virtual machine code in the first embodiment;

DETAILED DESCRIPTION OF THE INVENTION

The following describes a preferred embodiment of the present invention with reference to the drawings.
(First Embodiment)
The following describes a storage medium and an information processing device of one embodiment of the present invention using FIG. 1.

A virtual machine code 121, which is a program that operates on a virtual machine, is recorded on a storage medium 102. One implementation example of the storage medium 102 is a BD (Blu-Ray Disc), although the storage medium 102 is not limited to this. Furthermore, the virtual machine code 121 is composed of a virtual machine verifying module 1121, a verification information storing module 1122, and a code-dependent processing module 1123. The modules are described in detail later.

Figure 1:
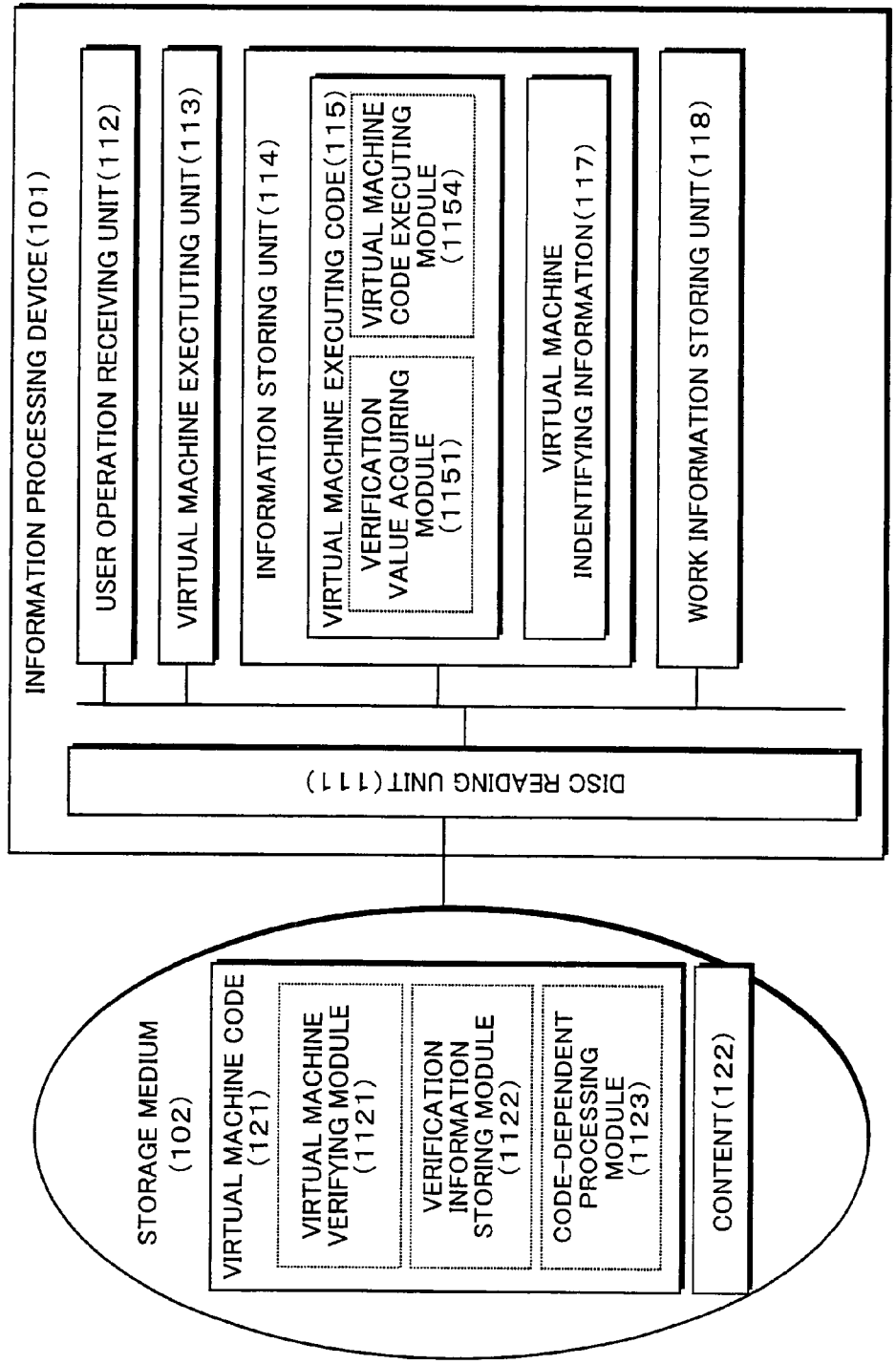
FIG. 1 shows a structure of a storage medium and an information processing device in a first embodiment.

An information processing device 101 is an device that executes the virtual machine code 121 using a virtual machine, and, as shown in FIG. 1, is composed of a disc reading unit 111, a user operation receiving unit 112, a virtual machine executing unit 113, an information storing unit 114, and a work information storing unit 118. A virtual machine is software that executes a program that is implemented as the virtual machine code 121 by converting it into native code of a platform, in order to have the program operate without depending on a platform such as a CPU or an OS. As one specific example, the virtual machine is a Java (trademark) virtual machine and the virtual machine code 121 is Java (trademark) byte code, but they are not limited to being so.

One example of a method for implementing the information processing device 101 is a computer system composed of a CPU, a work memory, a flash memory, a BD drive, and a remote control. Here, the disc reading unit 111 is the BD (Blu-ray Disc) drive, the information storing unit 114 is the flash memory, the user operation receiving unit 112 is the remote control, the work information storing unit 118 is the work memory, and the virtual machine executing unit 113 is software that operates using the CPU and the work memory. However, the virtual machine executing unit 113 is not limited to being structured by software, and may be implemented in hardware or the like. Neither are other embodiments limited to this arrangement.

Furthermore, the information storing unit 114 stores a virtual machine executing code 115 and a virtual machine identifying information 117. The virtual machine executing code 115 is software, and is composed of a verification value acquiring module 1151 and a virtual machine code executing module 1154. The modules are described in detail later.

The virtual machine identifying information 117 is information for identifying the virtual machine, and, for example, may be an eight-byte piece of data composed of "an information processing device manufacturer ID+an information processing device model number+a virtual machine version number". However, it is not limited to being of this composition, provided that the virtual machine identifying information 117 can uniquely specify the virtual machine.

Here, a creation method of the verification information is described. Providers of legitimate virtual machine executing code 115 submit, for each virtual machine, a virtual machine-specific verification rule table of the type shown in FIG. 4 and a piece of virtual machine identifying information 117 to a virtual machine management organization. Note that the above verification rule tables may be the verification rule tables and identifying information for each of playback devices on which virtual machines are installed. The virtual machine management organization then provides legitimate users who are to implement the virtual machine code with legitimate virtual machine verification rule tables and virtual machine identifying information 117. Based on these, the users who are to implement the virtual machine code create verification information. FIG. 4 is one of the virtual machine-specific (playback device-specific) verification rule tables. The verification rule table is composed of the following items for instance: an address 401 for use in verification; a verification timing 402 indicating when verification is to be performed; a verification value 403 indicating a value that should be stored at the address 401 at the verification; and a verification rule 404 indicating a state of the verification value required for the verification to be successful. The address 401 may be a specific address or a range of specific addresses as shown in FIG. 4. The composition of the verification rule table is not limited to the table composition of FIG. 4.

Note that, in the present embodiment, the storage medium 102 is assumed to be a BD, and the virtual machine code 121 recorded thereon is loaded into the information processing device 101 by the disc reading unit 111. The present invention, however, is not limited to this embodiment. The virtual machine code 121 may be loaded into the information processing device 101 using another embodiment. For instance, the disc reading unit 111 may be replaced with an internet connecting unit and the virtual machine code 121 may be loaded into the information processing device 101 via the internet.

This completes the description of the storage medium and information processing device of the first embodiment of the present invention.

(Execution of Virtual Machine Code)

Figure 2:
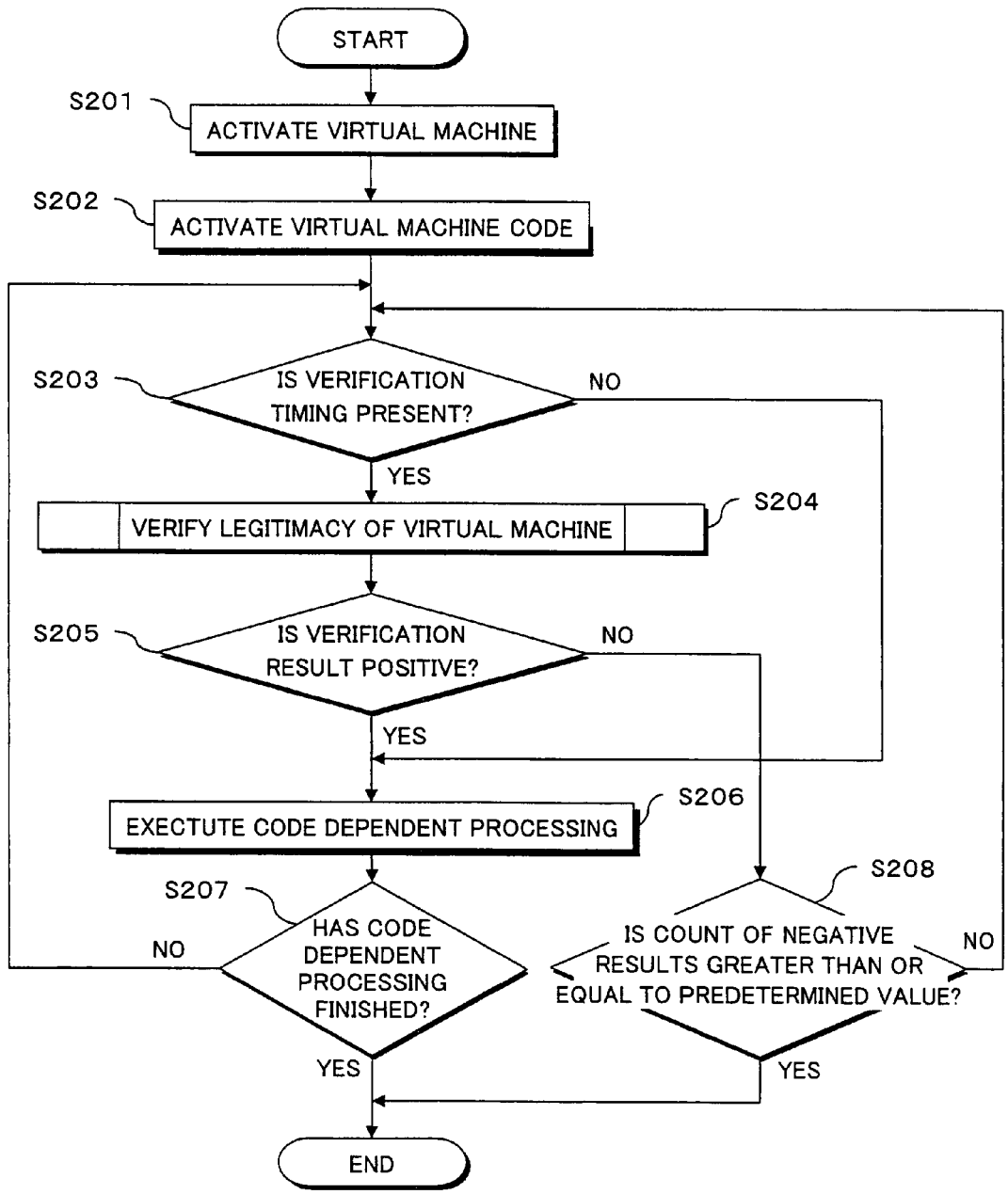
FIG. 2 is a flowchart of virtual machine code execution processing in the first embodiment.

Next, the execution of the virtual machine code in the information processing device 101 is described using FIG. 2.

Firstly, the processing is begun by the information processing device 101 receiving an instruction to execute the virtual machine code 121 stored in the storage medium 102.

On being instructed to execute the virtual machine code 121, the virtual machine executing unit 113 loads the virtual machine executing code 115 from the information storing unit 114 and activates the virtual machine (S201).

Next, the virtual machine executing unit 113 reads the virtual machine code 121 from the storage medium 102 via the disc reading unit 111, and activates the virtual machine code 121 on the virtual machine (S202).

Using the virtual machine verifying module 1121 and the verification information storing module 1122, the virtual machine code 121 activated on the virtual machine checks whether the current time is the verification timings 402 for verifying the legitimacy of the execution environment including virtual machine executing the machine code (Step 203).

Then, when the current time is the verification timing 402, the virtual machine code 121 performs verification of the legitimacy of the executing environment including the virtual machine (S204). The details of this processing are described later.

The virtual machine code 121 determines a verification result of S204 (S205). When it is negative, the virtual machine code 121 checks whether or not the count of negative results has reached a predetermined value (S208). Here, if the count of negative results is greater than or equal to the predetermined value, execution ends as the virtual machine code has been implemented to terminate its own execution in such a case.

If, in S208, the count of negative results has not reached the predetermined value, the processing restarts from S203. The predetermined value may be one or be a plurality, an increase in the accuracy of verification being obtained if a plurality is used.

When the verification result of S205 is positive, code-dependent processing defined by the code-dependent processing module 1123 in the virtual machine code 121 is executed (S206). In the code-dependent processing module 1123, different processing is defined for each of the virtual machine codes 121. For example, the code-dependent processing may be defined as the decryption processing of content 122, such as that of a movie recorded separately on the storage medium 102, and the code-dependent processing module 1123 may perform the decryption processing as copyright protection processing for the content 122. However, the code-dependent processing is not limited to this.

When the code-dependent processing has ended, execution of the virtual machine code 121 ends (S207: YES).

This completes the description of the execution of the virtual machine code 121 in the information processing device 101.

(Legitimacy Verification of Execution Environment Including Virtual Machine)

The details of legitimacy verification of an execution environment including a virtual machine are described below. This processing is for verifying, using the virtual machine code 121, whether or not the execution environment including the virtual machine that is to execute the virtual machine code 121 is legitimate.

The virtual machine executing code 115 can be implemented by anyone because the information required for implementation, such as the interface, processing content, and the like, are publicly available. For this reason, if an executing code is not the legitimate virtual machine executing code 115, there is a possibility that illegitimate operations will take place when the virtual machine code 121 is executed, and that the processing of the virtual machine code 121 will be performed improperly. If the virtual machine code 121 is, for example, a program for protecting the copyright of the content 122 consisting of a movie or the like recorded separately on the storage medium 102, the content 122 would be played back illegitimately and copyright protection would no longer be possible. Hence, verification processing for the execution environment including the virtual machine is required.

The modules that make up the virtual machine code 121 are described below. The virtual machine verifying module 1121 is a module for verifying whether the execution environment including the virtual machine that executes the virtual machine code 121 is legitimate. The verification information storing module 1122 is information for verifying the legitimacy of the execution environment including the virtual machine. Specifically, this verification of the legitimacy of the execution environment including the virtual machine involves the virtual machine code 121 acquiring the virtual machine identifying information 117 and a value for verification from the virtual machine, and verifying the virtual machine based on whether the value satisfies the verification rule stored in the verification information storing module 1122. As a result, even if an emulator including copied data such as a player model number and a manufacturer name is created for some other playback device, and is, for instance, mounted in a computer together with a virtual machine, playback using such a illegitimate emulator can be prevented. This is because it is difficult to create an emulator which will satisfy the requirement of the verification rule table 400 of FIG. 4 for each virtual machine, and the emulator will be likely not to satisfy the requirement. The details of the verification processing are described later.

FIG. 5 is an example of the verification rule table 500 stored by the verification information storing module 1122. The verification rule table 500 stored by the verification information storing module 1122 indicates correspondences between part or all of the verification rule table 400 for each virtual machine shown in FIG. 4 and the virtual machine identifying information 117. The creator of the machine code 121 can freely select and apply the verification rules used in the verification rule table 500 stored by the verification information storing module 1122 from the verification rule table 400, enabling verification to be performed individually for each of the virtual machine codes 121.

The modules constituting the virtual machine executing code 115 are described below.

The verification value acquiring module 1151 is a module for searching the work information storing unit 118 for the address specified by the virtual machine verifying module 1121 in the virtual machine code 121, and acquiring the values stored at that address.

The virtual machine code executing module 1154 is a module for converting the processing defined by the code-dependent processing module 1123 of the virtual machine code 121 to the native code for the platform, and executing the code which has been converted.

Figure 3:
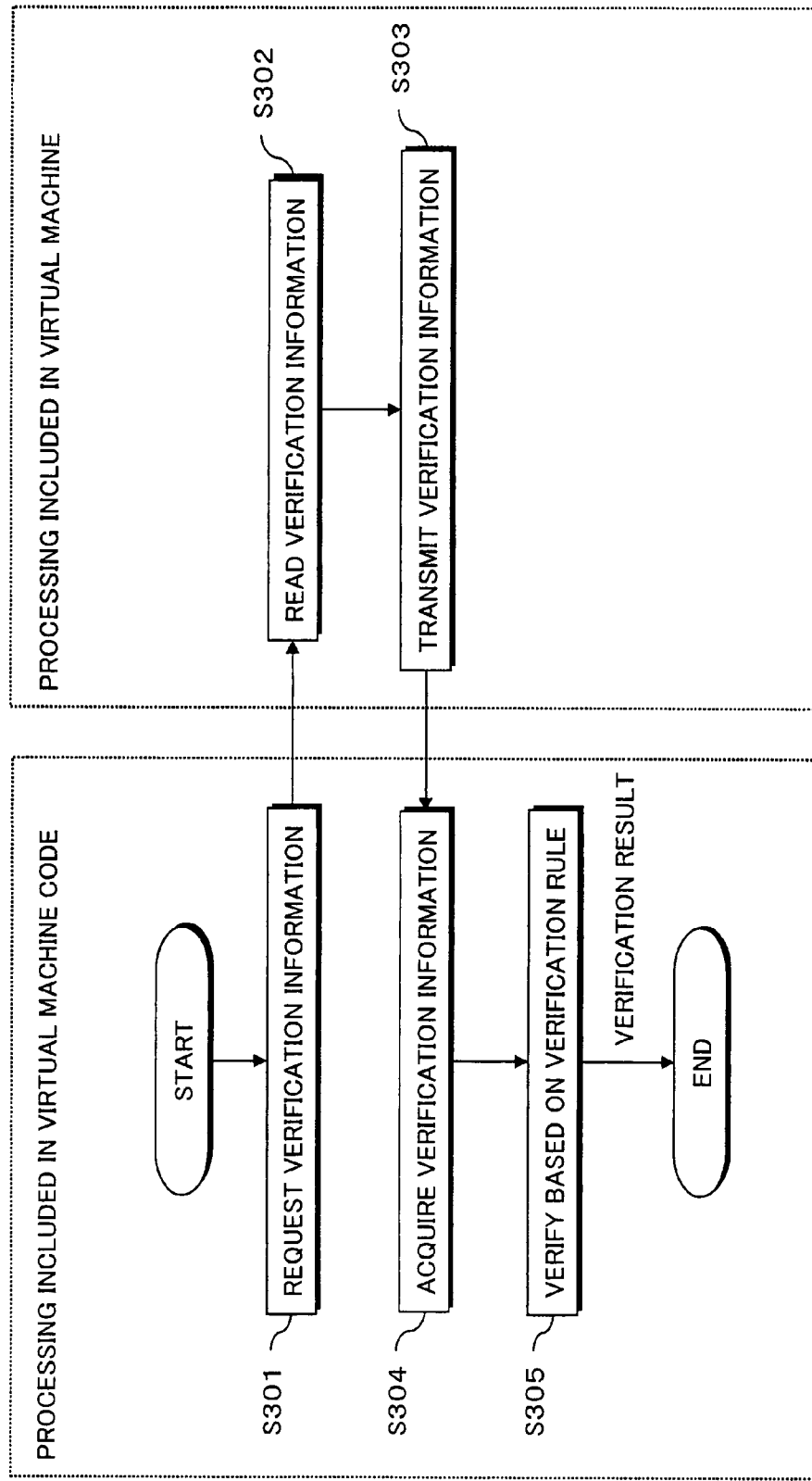
FIG. 3 is a flowchart of processing for verifying legitimacy of an execution environment including a virtual machine in the first embodiment.

Next, the flow of the processing for verifying legitimacy of the execution environment including the virtual machine is described using FIG. 3.

First, on activation of the virtual machine code 121 in S202 of FIG. 2, the virtual machine verifying module 1121 compares the virtual machine identifying information 117 stored in the information storing unit 114 with the verification rule table 500 stored in the verification information storing module 1122, and detects the verification timing 402 that is to be used. For example, if the virtual machine-identifying information 117 is 0x0011ff0000011001, the processing is as follows. In S203, when the current time is the detected verification timing, the following verification processing is performed.

First, the virtual machine code 121 specifies the address 401 corresponding to the verification timing 402, and makes a request for verification information (S301). For example, when menu 1 has been displayed, the virtual machine code 121 specifies address 0x00ff0001, and makes a request for verification information.

The virtual machine acquires the value stored at the specified address 0x00ff0001 of the work information storing unit 118 (S302), and returns this value to the virtual machine code 121 as the verification information (S303).

The virtual machine code 121 acquires the returned verification information (S304), verifies the verification information and the verification value 403 based on the verification rule 404, and passes a result of the verification to S205 of FIG. 2.

In this example, the verification result is positive if the verification information is 0xed, and is otherwise negative.

This completes the description of the processing for verifying the legitimacy of the execution environment including the virtual machine.

Note that, it does not matter whether the address 402 is a physical address or a logical address, and whether the address 402 is a real address or a virtual address, provided that a legitimate virtual machine executing the virtual machine code 121 is able to acquire information at the address 402. Further, instead of using the specified address as original form, the virtual machine may acquire the verification information after converting the specified address into an address suitable for the work information storing unit 118 based on address map information. The address map information may be capable of indicating the relevant area of the work information storing unit 118, and may be composed to support dynamic transformations as well as static transformations.

Further, though in the present embodiment a data length of one byte is used as the data length of the verification value, the data length is not limited to this.

Further, it is not necessary that all regions of the work information storing unit 118 are accessible by the verification value acquiring module 1151, and the work information storing unit 118 can be implemented such that a portion of the regions is not accessible. This enables resistance to malicious analysis of the execution environment including the virtual machine to be increased.

(Example of Verification Rule)

In the present embodiment, the values in the work information storing unit 118 are acquired and used as verification information. These values used as verification information and the verification rules are described below. Note, however, that the verification information is not limited being these values, and that any value existing in the work information storing unit 118 is a candidate for the verification information.

(1) Information Relating to Content

For example, according to the verification rule table 500 of FIG. 5 stored in the verification information storing module 1122, positive verification will take place if a value equaling a time stamp of an index file in the content 122 is included in the data between the addresses 0x0010044 to 0x001100ff when an initial moving image is played back. As described above, in the execution environments that contain a legitimate virtual machine, information relating to a content is stored in a specific region of the work information storing unit 118 at a particular timing. When the virtual machine code 121 is executed, the legitimacy of the execution environments can be assessed by verifying whether or not the stipulated information exists in the specified region. Note that, instead of a range of addresses, a single address may be specified. Also, the addresses and the verification timing will depend on the execution environment including the virtual machine.

Besides the above information, it is possible to use an index file, a navigation file, or other file sizes or time stamps stored in the storage medium 102 as the information relating to the content. Moreover, any information can be used provided that it relates to the content, including a play list or play item numbers stored in the storage medium 102, part or all of the values in a content hash table, part or all of the sound data for when a button is pushed, part or all of the hash values of an index table, or the like.

(2) Information Dependent on Execution Environment Including Virtual Machine

Figure 6:
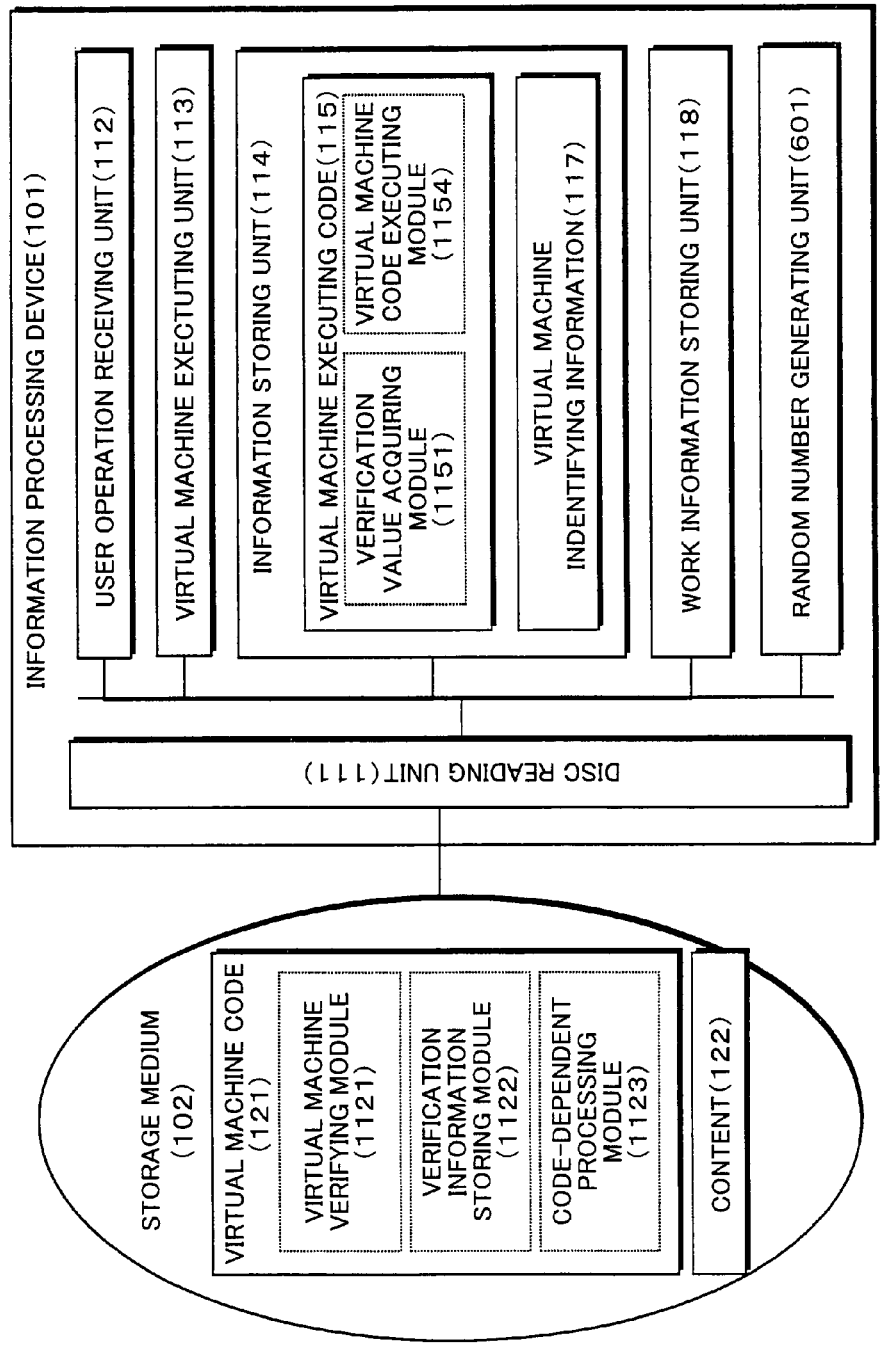
FIG. 6 shows an example of the structure of a storage medium and an information processing device in the first embodiment.

As shown in FIG. 6, the information processing device 101 may for instance have a random number generating unit 601 added to it, and be implemented in such a way that the random number generating unit 601 is caused to operate in accordance with an instruction by the virtual machine code 121. Then, as shown in the verification rule table 500 of FIG. 5 that is stored in the verification information storing module 1122, when a disc is inserted, the execution environment including the virtual machine is made to generate a random number and to store the random number at the address 0x00aa0010. The virtual machine code 121 then stores this value. Subsequently, at the beginning of playback or upon a user operation, the execution environment is made to generate and store a random number at the address 0x00aa0010 again. The virtual machine code 121 acquires this newly generated random number, compares it with the previously stored random number, and if the new value is different, gives a positive verification. As long as an illegitimate virtual machine has no random number generating function or knows not where to write the random number, a positive verification will not be given. Note that choosing a value, such as an address or the virtual machine identifying information 117, which differs for each execution environment including a virtual machine as a seed for the random number will reduce the chances of generating the same random number.

Note also that the resources such as memory used by the virtual machine vary according to the implementation conditions. Thus, it is possible to have verification be positive if, for instance, a region of empty memory in the work information storing unit 118 is within a specified range of values during execution of the virtual machine code 121. In this case, in an environment where an illegitimate virtual machine is operating, if the region of empty memory is outside this range, a positive verification will not be given.

Besides the above, as the information depending on the execution environment including the virtual machine, it is possible to use information such as hash calculation values (for example, values calculated using the most recent values returned by the virtual machine code) and displayable information relating to the content but being displayed differently for each information processing device 101 (for example, a number of buttons of a menu, differences in audio or video playback capabilities).

Thus, in verification, it is possible to use values dependent on functions and states characteristic of the execution environment including a virtual machine, or to use various values dependent on other information.

(3) Time Dependent Information

Figure 7:
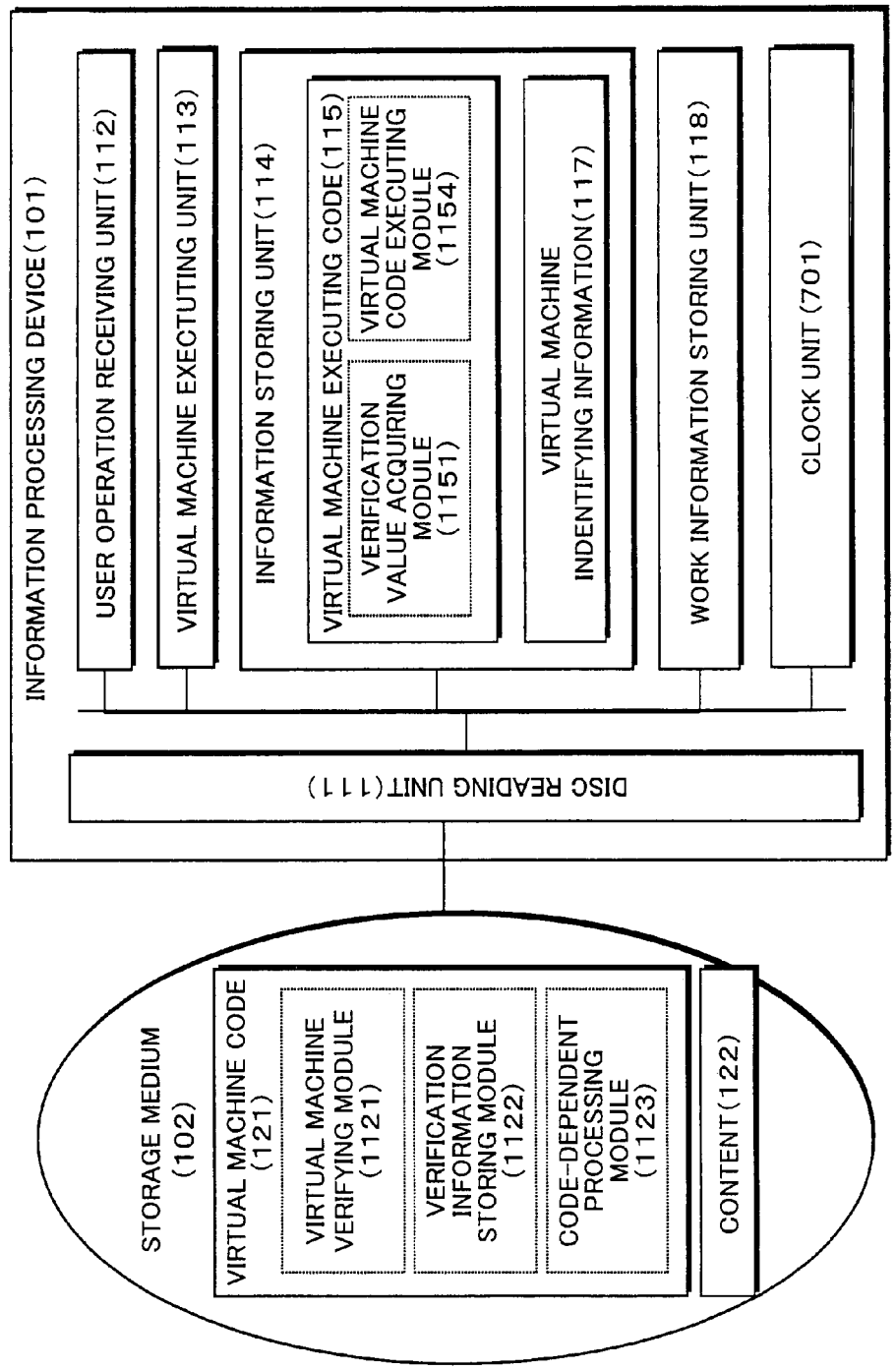
FIG. 7 shows an example of the structure of a storage medium and an information processing device in the first embodiment.

For example, the information processing device 101 has a clock unit 701 added to it as in FIG. 7. The clock unit 701 keeps the current time, and is implemented so that the current time is written in a specific region of the work information storing unit 118. Then, as indicated in the verification rule table 500 of FIG. 5, which is stored in the verification information storing module 1122, when a disc is inserted, the virtual machine code 121 acquires a value for the current time from 0x00eee002, and stores the value. Then, when a clip file is switched, the virtual machine code acquires a value for the current time from the same address, compares it with the previously stored value, and if the value for the current time is greater than the stored value gives a positive verification. Here, as the verification rule is that the value must not only be different but must have increased, it will be impossible to create an illegitimate environment without knowledge of this implementation.

Further, there are titles for which fast-forwarding is prohibited. When one of these titles is to be played back, information for prohibiting the fast-forwarding is stored in a specific region of the work information storing unit 118. In such cases, when the title is to be played back, the virtual machine code 121 checks the current state of the specific region and gives a positive verification if the information there indicates that fast-forwarding is prohibited.

Besides the above, information relating to the information processing device 101, such as system parameters and operation parameters, or information such as chapter numbers of the data currently being played back, timing information included in the data stream currently being played back (such as ATS, PTS, and PCR), can be used as the time dependent information.

Virtually any time varying information can be used in the verification processing in this way. It is to be noted, however, that if time varying information with a very high transmission rate is used, such as the content information itself (regardless of whether it is encrypted, decrypted, encoded or decoded), it is difficult to accurately predict what information will be contained in memory at a specific address at a predetermined timing even in legitimate devices, and it is therefore preferable that information that is substantially predictable by the manufacturer of the player is used. In particular, when the information is time varying data and, for example, a rule stipulating multiple memory checks to confirm a varying value is used, it is necessary to check the information using tighter set timings and check timings. However, accurately timed verification is difficult to realize, and it is therefore preferable either not to use information whose transmission rate is very high, or to relax the verification rule 404 regarding what is judged to be a legitimate device.

The verification rule table 500 stored in the verification information storing module 1122 may combine the above described information in any way, and it is possible to create a specific verification rule table 500 for each execution environment including a virtual machine.

(Second Embodiment)

Figure 8:
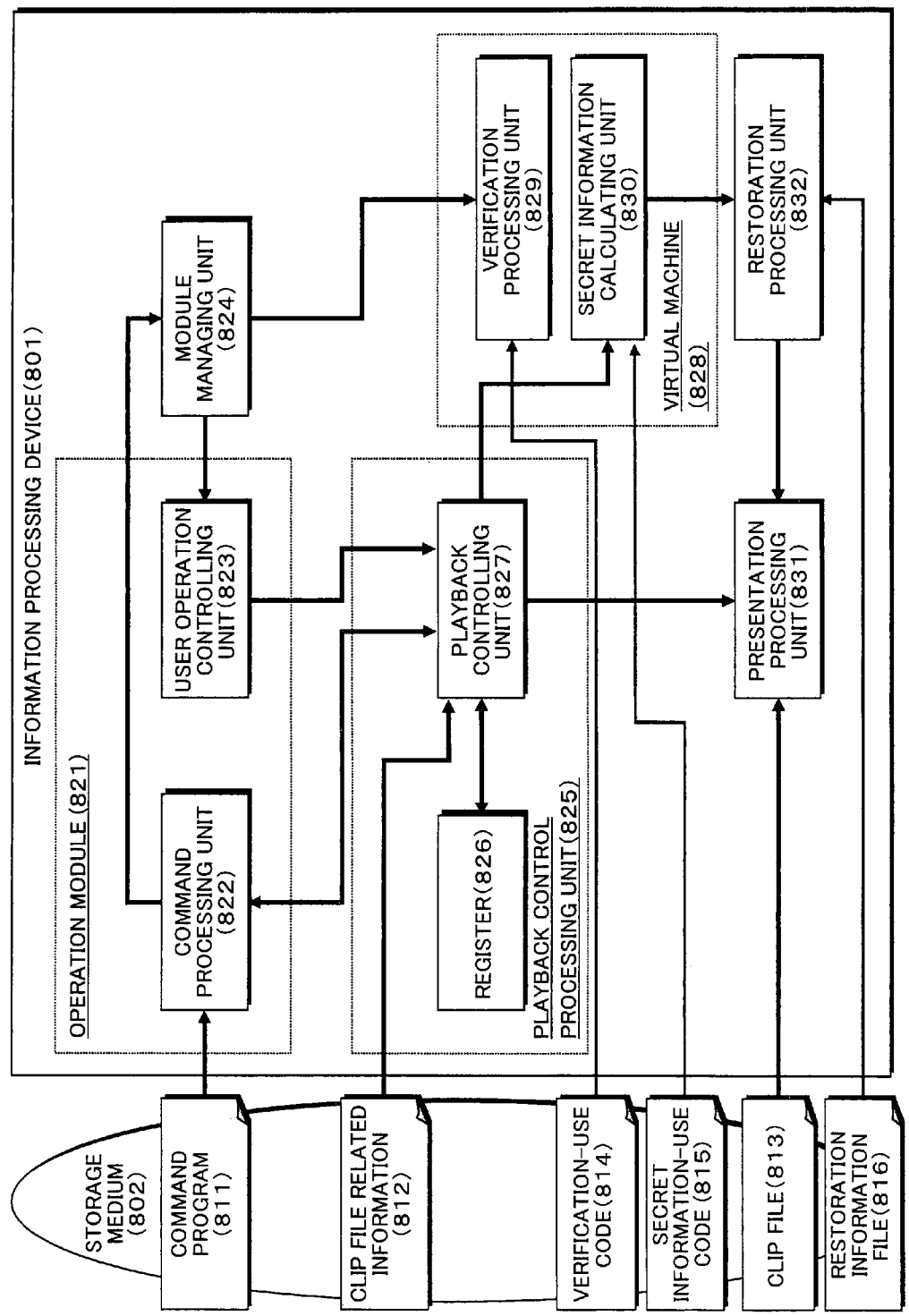
FIG. 8 shows a system model for a storage medium and information processing device in a second embodiment.

FIG. 8 shows the system model of a storage medium and an information processing device in a second embodiment of the present invention.

As shown in FIG. 8, the storage medium 802 includes: a command program 811 for regulating the playback order and the behavior upon user operations; clip file related information 812 which describes items such as clip file attributes, a time search map, a play list, play items, and the like; a clip file 813 which includes content such as video and audio data; a verification use code 814 which is used for verifying the legitimacy of an execution environment including a virtual machine; a secret information use code 815 which is used in the content restoration processing; and a restoration information file 816 which is combined with the secret information to generate actual restoration information when restoration processing is performed.

The information processing device 801 includes: a command processing unit 822 for processing the command program 811; a module managing unit 824 for receiving user input and transmitting it to the user operation controlling unit 823 and, further, for managing playback titles in the content; the user operation controlling unit 823 for calling up functions corresponding to the user operations from the playback control unit 827 and controlling these functions; a register 826 for storing device state and processing variables; the playback control unit 827 for performing processing for the play list and play items of the clip file related information 812, for performing processing for call up functions indicated by the command processing unit 822 or the user operation controlling unit 823, and for controlling the presentation processing unit 831; a verification processing unit 829 for executing the verification use code 814 to verify the legitimacy of the execution environment including the virtual machine; a secret information calculating unit 830 for calculating, from the secret information use code 815, secret information to be used in the restoration processing of the content; the presentation processing unit 831 for controlling the playback and display of the content; and the restoration processing unit 832 for generating restoration information based on the restoration information file 816 and the secret information, and for notifying a presentation engine of the restoration of the content. The section including the command processing unit 822 and the user operation controlling unit 823 is called an operation module 821, the section including the register 826 and the playback control unit 827 is called a playback control processing unit 825, and the section including the verification processing unit 829 and the secret information calculating unit 830 is called a virtual machine 828. The above composition is an example composition, a specific example being the information processing device 801 that is a processing device including a BD drive, but the device being neither limited to a hardware implementation nor to a composition using software. The operations of the information processing device 801 are described below using the procedures of FIG. 8, FIG. 9, and FIG. 10.

Figure 9:
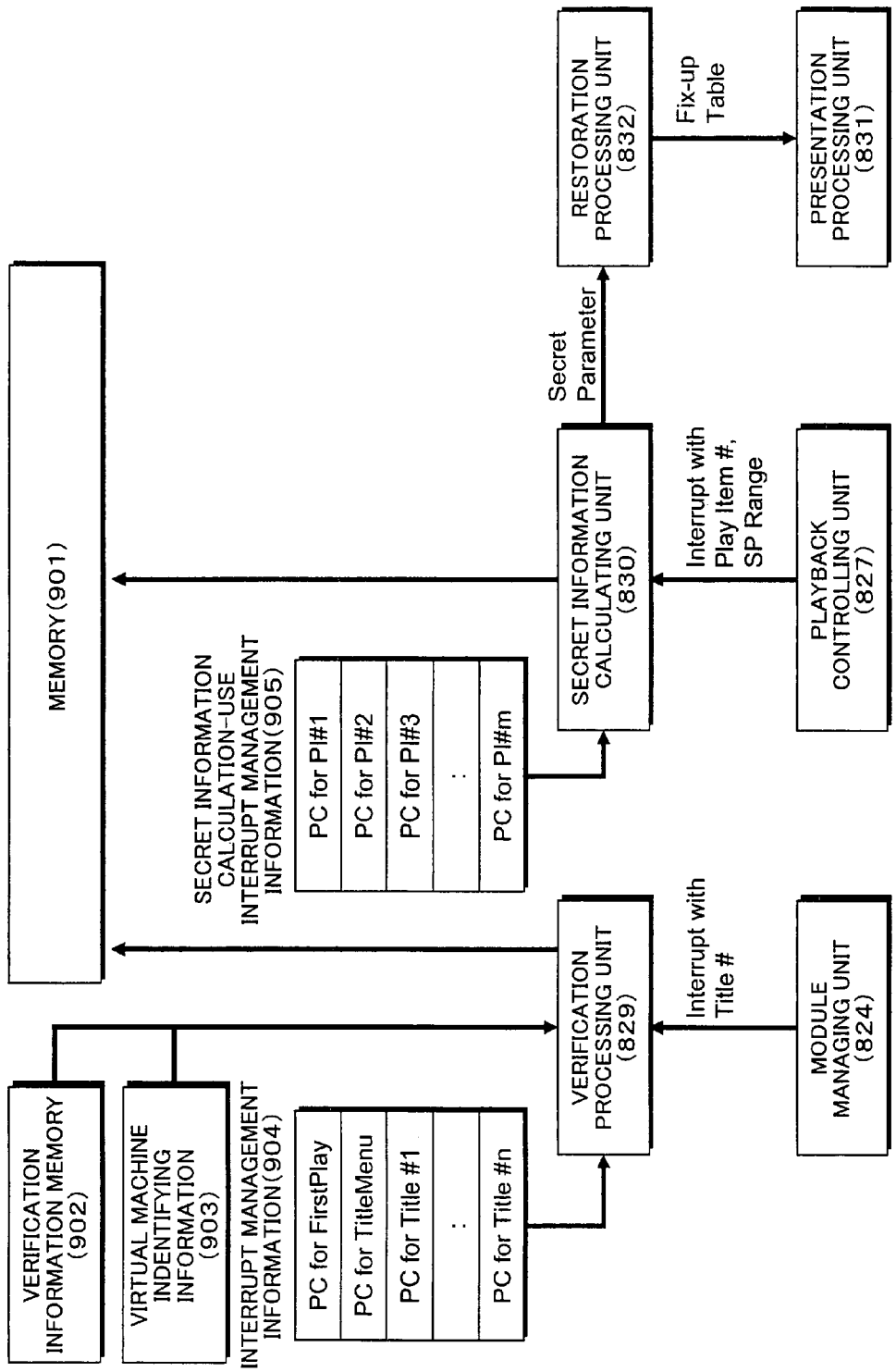
FIG. 9 shows the operations of verification processing and restoration processing in the second embodiment.

FIG. 9 shows the operations of the verification processing and content restoration processing in the information processing device 101.

Firstly, the verification processing unit 829 acquires the virtual machine identifying information 903 stored in the virtual machine 828 (S1001) loads part or all of the verification use code 814 corresponding to the virtual machine identifying information 903, and acquires and saves the interrupt management information 904 (S1002). The interrupt management information 904 is information for deciding, according to a playback location of each title for instance, one or more execution starting locations (PC: program counters) in the verification use code 814, and describes combinations of execution starting locations and playback locations. Note that the virtual machine identifying information 903 is information for identifying the virtual machine, and, for example, may be an eight-byte piece of data composed of "an information processing device manufacturer ID+an information processing device model number+a virtual machine version number". However, it is not limited to being of this composition, provided that the virtual machine identifying information 903 can uniquely specify the virtual machine. Further, the virtual machine identifying information 903 may be given a signature and the verification processing unit 829 may check the legitimacy of this signature.

Next, the module managing unit 824 issues an instruction, including the title number of the content to be played back, to start verification processing to the verification processing unit 829 (S1003).

Based on the title number included in the instruction, the verification processing unit 829 acquires the applicable PC from the interrupt management information 904, and executes the verification use code 814 from the acquired PC (S1004).

Next, the executed verification use code 814 accesses the verification information memory 902 that includes a memory region accessed at verification, and performs verification of the execution environment including the virtual machine (S1005). Note that, since it is possible to use the verification methods described in the first embodiment, a detailed description of the verification method is omitted here.

When the verification result is positive, the processing continues (S1006). When it is negative, the processing continues providing that the count of negative results has not reached the predetermined value. However, if the count of negative results has reached the predetermined value (S1007), the information processing device 101 can be prevented from operating normally by overwriting part or all of the content or secret information use code 815, or by overwriting other data at specified locations in the memory 901 storing other processing data (S1008). Specifically, since during playback the secret information calculating unit 830 stores in the memory 901 either the secret information use code 815 or secret information required for restoration processing, by overwriting a part or all of this information, the restoration processing is prevented from proceeding normally, and normal playback is effectively rendered impossible. The restoration processing is described later. Further, since it is possible to arrange for a part of the title currently being played back to be additionally stored in the memory 901, it is possible by overwriting a part or all of such a title in the memory 901 if the verification result is negative, to effectively render any execution environment including an illegitimate virtual machine incapable of normal playback. The information to be overwritten is not limited to the above information. The same effect will be obtained even if other information is overwritten.

Note that though information in the memory 901 was described as being overwritten if the verification result was negative, but the present invention is not limited to this, and the module managing unit 824 may be notified of the negative result, and may indicate to stop playback. Further, the secret information calculating unit 830 may be notified of the negative result in order to stop calculation of the secret parameters. Again, the present invention is not limited to this, and other compositional element able to make normal playback impossible may be notified of the negative result.

Further, as a verification processing starting instruction in S1003 is an instruction that is issued every time the playback title is switched by a user operation for instance, it is issued irregularly. However, during the special playback operations of fast-forwarding, rewinding, or the like, there is a danger that data stored in the verification information memory 902 will have changed before a single verification processing cycle is completed, and it is therefore acceptable in such cases not to issue the verification processing starting instruction. Further, when a new verification processing starting instruction including a different title number is issued while verification processing (repetition of S1005 to S1007) is being executed, the verification processing being executed is terminated, and the verification use code 814 corresponding to the new title number is executed (the processing restarts from S1004).

Further, it is possible, depending on the title number received in the verification starting instruction in S1003, to make the verification use code 814 in S1004 not to be executed. Specifically, there are two methods to achieve this: either title numbers for which execution of verification use code 814 is unnecessary are omitted from the interrupt management information 904 by the party generating the verification use code 814, or certain PCs are specified in the secret information calculation-use interrupt management information 905 by the same party and it is stipulated that the verification use code 814 is not to be executed for any of the specified PCs.

Further, the verification information memory 902 and the memory 901 may be different regions on one physical memory. Further, a region in which access is prohibited and a region in which overwriting is prohibited may be set to each memory.

This structure effects such as improved prevention of erroneous operation and increased resistance to malicious analysis can be achieved.

(Restoration Processing)

The following type of method can be used in the above restoration processing.

As shown in FIG. 8 and FIG. 9, the secret information calculating unit 830 first loads the secret information use code 815, and acquires and saves the secret information calculation-use interrupt management information 905. The secret information calculation-use interrupt management information 905 is, for example, information which determines the execution starting position (secret information-use PC (program counter)) of the secret information-use code 805 for each play item number, and describes correspondences between the play item numbers and the secret information-use PCs.

The restoration processing unit 832 reads and then saves a part or all of the restoration information file 816.

The playback control unit 827 keeps track of which position and which play item is currently being played back, and when a specific play item is being played back, will notify, every ten seconds for example, the secret information calculating unit 830 of period information indicating the play item number of the play item and the ordinal number of the current playback period. Note that, rather than the ordinal number of the playback period, a number of seconds may be used in the notification. Further, rather than every 10 seconds, the timing of notification may set to be a different regular interval such as every second, or an irregular interval such as whenever a play item switches, or the like. Moreover, this notification timing information may be included in the secret information-use code 815, and the playback control unit 827 may acquire the timing information from the secret information-use code 815.

Next, based on the play item number having been notified, the secret information calculating unit 830 acquires the secret information-use PC from the secret information calculation-use interrupt management information 905, and executes the secret information-use code 815 from the corresponding location.

The executed secret information-use code 815 calculates the secret information appropriate for the playback period based on the period information, and notifies the restoration processing unit 832 of the result.

The restoration processing unit 832 acquires the restoration information appropriate for the playback location from the restoration information file 816. And, the restoration processing unit 832 decrypts the restoration information by performing, using the secret information, an XOR (Exclusive OR) calculation or the like, and notifies the presentation processing unit 831 of the decrypted restoration information.

The presentation processing unit 831 performs the XOR of data at the restoration positions, which are included in the restoration information, and the restoration data included in the restoration information, and overwrites the data at the restoration positions with the resultant data. The restoration positions can be any information capable of uniquely specifying the positions of the data to be restored, including ordinal numbers of packets from the head packet of the clip file, read-off time information attached to the packet, playback time information, or the like.

In this way, it is possible to restore transformed content data, and to play it back normally. Accordingly, when the result of the above verification processing is negative for instance, it is possible, by overwriting a part or all of the region of the memory 901, to render the secret information calculating unit 830 incapable of acquiring correct secret information, making normal playback impossible. Note that the data to be overwritten can be any data necessary for these calculations, including the secret information-use code 815, part or all of the secret information, or the like.

Note that, though the play item number was used, it is possible to use any information capable of uniquely specifying the current playback point, including the title number, the play list number, the play item number, and some combination of these.

Further, though the presentation processing unit 831 was described as performing the XOR of the data at the restoration positions and the restoration data, and as overwriting the data at the restoration positions with the result, the presentation processing unit 831 needs not to be notified of the restoration information by the restoration processing unit 832, and may perform the XOR calculation and the overwriting by directly referencing to the clip file stored in the memory 901.

Figure 11:
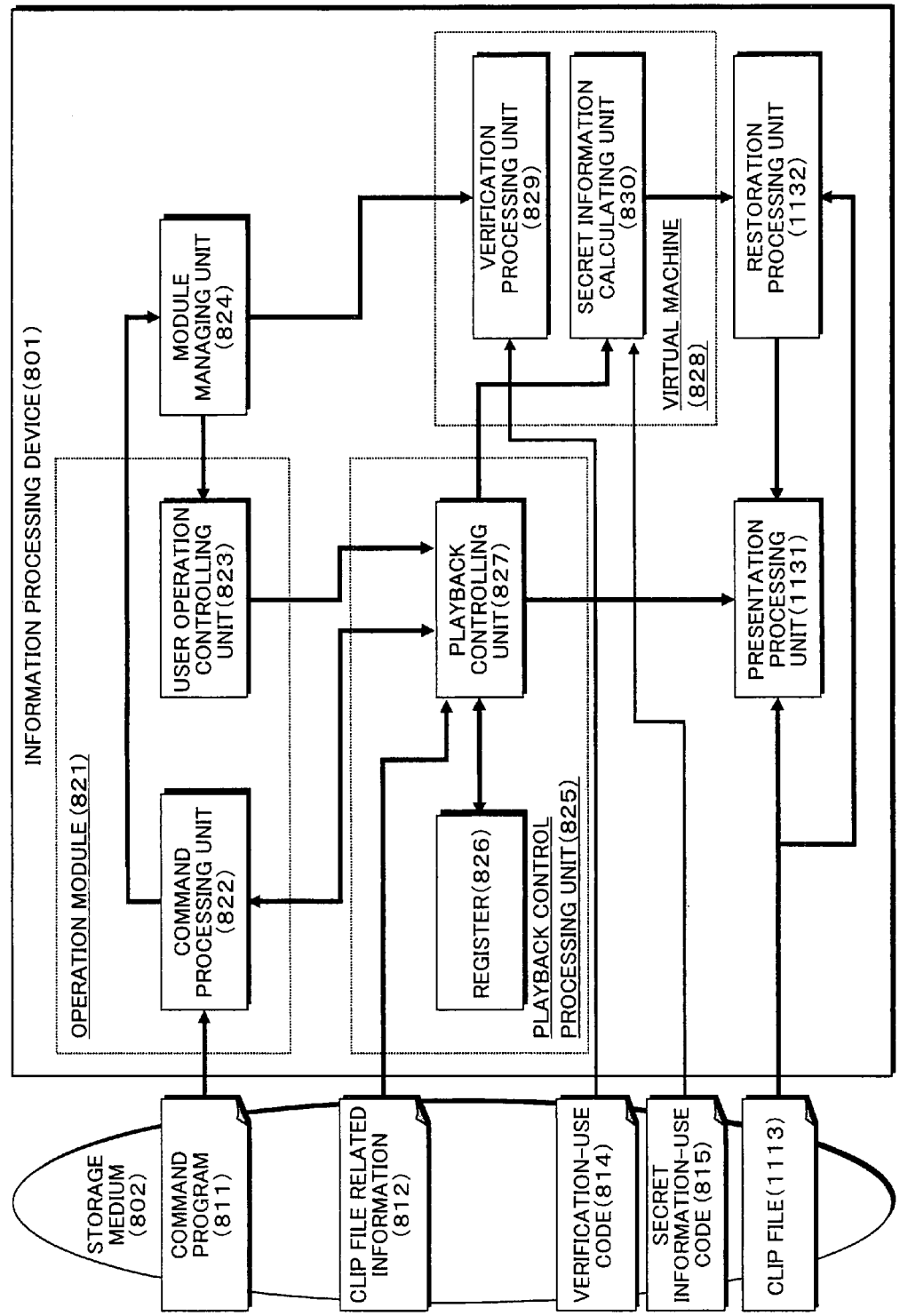
FIG. 11 shows an example of the system model for the storage medium and the information processing device in the second embodiment.

Note that, though the restoration information file 816 was described as including the restoration information, as shown in FIG. 11, it is also possible for the restoration information to be multiplexed into the stream of the clip file 1113. If this is the case, the restoration information is stored in PMT or original packets, and these packets are multiplexed into a data stream such as video or audio streams. In such a case, the restoration processing unit 1132 acquires the packets including the restoration information from the data stream being played back, and is thereby able to obtain the restoration information. Otherwise, the composition resembles that of FIG. 8.

The restoration information includes restoration positions each indicating the number of relative packets from the packet including the restoration information and the byte numbers of the data to be restored within the indicated packet, and further includes restoration data for the XOR and the data in the restoration positions. The restoration processing unit 1132 uses the secret information received from the secret information calculating unit 830 to decrypt the restoration information by performing an XOR or the like, and performs the XOR of the data in the restoration positions and the restoration data based on the decrypted restoration information. And then, the restoration processing unit 1132 overwrites the resultant data in the restoration positions, thereby enabling content that has undergone transformation to be restored.

Thus, it is possible to perform restoration processing when the restoration information is multiplexed into the data stream of the clip file instead of being stored in a file. In this case, the secret information calculating unit 830 processes in an identical manner as described above.

Note that the restoration processing unit 1132 may notify the presentation processing unit 1131 of the decrypted restoration information. In this case, processing can be performed by the presentation processing unit 1131 performing the XOR of the data in the restoration positions and the restoration data and overwriting the data in the restoration positions with the resultant data.

Further, though the XOR was used in the restoration processing and in the decryption of the restoration information, the encryption method is not limited to being XOR, and other calculation methods may be used, including AES (Advanced Encryption Standard) and DES (Data Encryption Standard).

Figure 12:
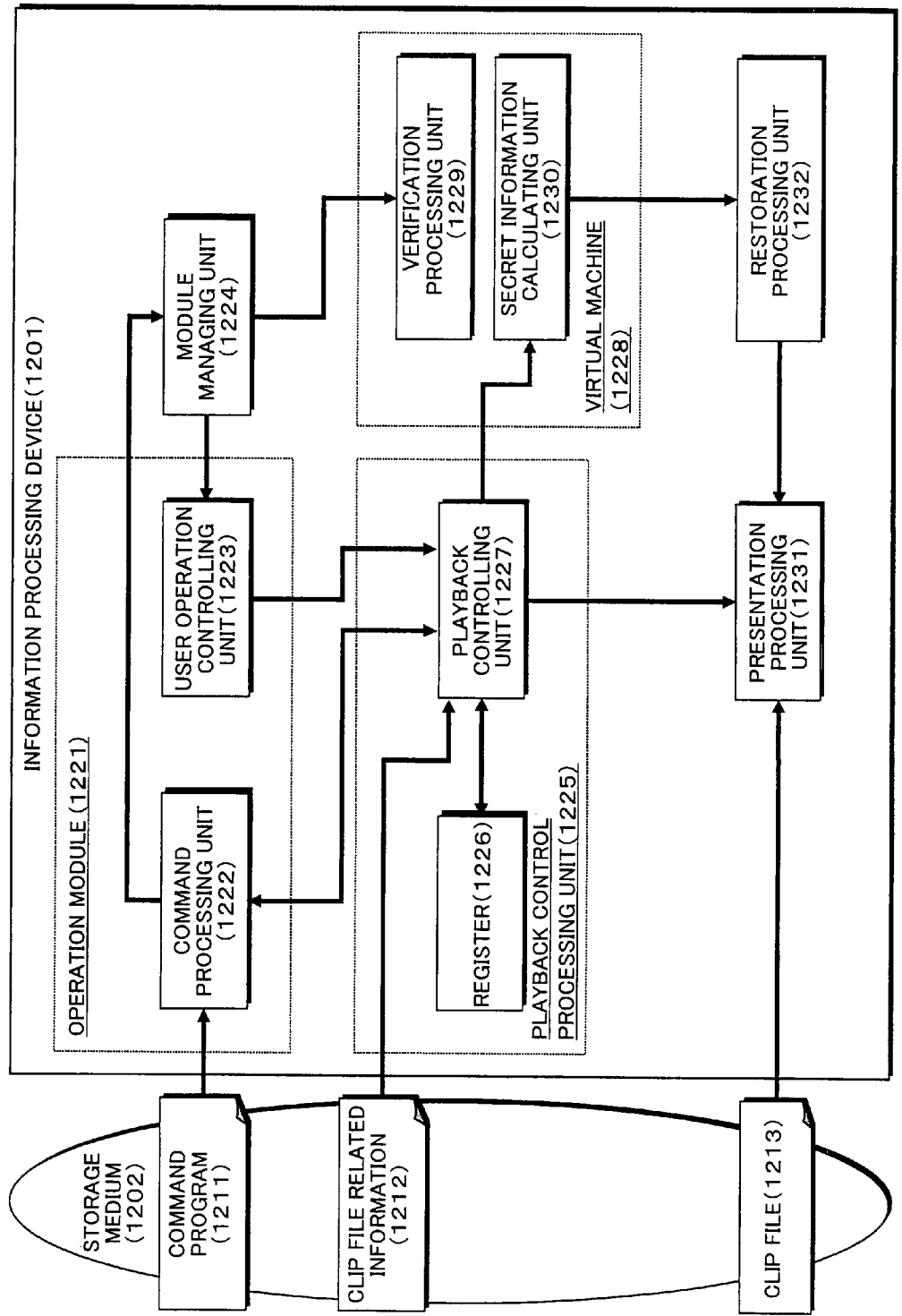
FIG. 12 shows a generalized system model for the storage medium and information processing device in the second embodiment.

Note that FIG. 12 is a composition that generalizes the compositions for restoration processing and verification processing shown in FIG. 8 and FIG. 11. In FIG. 12, except for the virtual machine 1228 and the restoration processing unit 1232, the main compositional elements are those of a general disc playback system model. In other words, a characteristic of this implementation for realizing the verification processing and restoration processing of the present invention is that it is possible without any significant alterations to a general disc playback system model being required.

Note that, though in the present embodiment the verification processing unit 829 was described as loading the verification-use code 814 directly, and the secret information calculating unit 830 as loading the secret information-use code 815 directly, the present invention is not limited to such an arrangement, and the data may be acquired via other compositional elements. Further, the verification-use code 814 and the secret information-use code 815 may be included in other information in the storage medium 802, such as in the command program 811 or in the clip file related information 812.

Further, the notifications, such as the restoration information and the interrupt information can be performed via general operation-use registers not shown in the drawings, via the memory 901, or the like, though the present invention is not limited to any of these methods.

Further, though the interrupt management information 904 was described as being acquired from the verification-use code 814, it may be recorded in a separate file, or in other information on the storage medium 802. Likewise, the secret information calculation-use interrupt management information 905 may be recorded in a separate file, or in other information on the storage medium 802.

MODIFICATION EXAMPLES

The present invention has been described based on, but is not limited to the above embodiment. Cases such as the following are included in the present invention.

(1) Each described device is, specifically, a computer system composed of a microprocessor, a ROM, a RAM, a hard disk unit, a display unit, a keyboard, a mouse, and the like. Computer programs are stored in the RAM or the hard disk unit. The information processing device achieves its functions by the microprocessor operating according to the computer programs. Each computer program is composed of a plurality of command codes that show instructions with respects to the computer, for achieving predetermined functions.

(2) A part or all of the compositional elements of each device may be composed of one system LSI (Large Scale Integration). The system LSI is a super-multifunctional LSI on which a plurality of compositional units are manufactured integrated on one chip, and is specifically a computer system that includes a microprocessor, a ROM, a RAM, or the like. Computer programs are stored in the RAM. The LSI achieves its functions by the microprocessor operating according to the computer programs.

Further, when the system LSI is used, it may be the case that the LSI manufacturer and the information processing device manufacturer are different companies. If this is the case and if the LSI manufacturer provides functions that can be used in verification, such as a random number generating function, a clock function, and the like, the information processing device manufacturer can stipulate a verification rule and verification use address suitable for the information processing device being manufactured. Therefore, the dual effect is obtained of the LSI manufacturer being able to reduce the cost of stipulating and managing verification rules separately for each LSI, and of the information processing device manufacturer being able to stipulate freely the verification rule in each version of the information processing device he manufactures.

(3) Part or all of the compositional elements of each device may be composed of a removable IC card or a single module. The IC card or the module is a computer system composed of a microprocessor, a ROM, a RAM, or the like. The IC card or the module may include the above super-multifunctional LSI. The IC card or the module may achieve its functions by the microprocessor operating according to computer programs. The IC card or the module may be tamper-resistant.

(4) The present invention may be methods shown by the above. Furthermore, the methods may be a computer program realized by a computer, and may be a digital signal of the computer program. Furthermore, the present invention may be a computer-readable storage medium such as a flexible disk, a hard disk, a CD-ROM, and an MO, a DVD, a DVD-ROM, a DVD-RAM, a BD (Blu-ray Disc) or a semiconductor memory, that stores the computer program or the digital signal. Furthermore, the present invention may be the computer program or the digital signal recorded in any of the above storage medium devices.

Furthermore, the present invention may be the computer program or the digital signal transmitted on a electric communication network, a wireless or wired communication network, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the storage medium, or by transferring the program or the digital signal via a network or the like, the program or the digital signal may be executed by another independent computer system.

(5) The present invention may be any combination of the above-described embodiment and modifications.

(6) The present invention is a verification method used in an information processing device that executes processing relating to playback of contents by using a virtual machine included therein, the verification method comprising: a reading step of reading a verification program stored on a storage medium together with the contents; and a verifying step of verifying, by using the virtual machine executing the verification program, legitimacy of the information processing device including the virtual machine.

Here, the "reading step" corresponds with the processing in S202 shown in FIG. 2 described in the first embodiment.

Also, the "verification step" corresponds with the processing in S204 shown in FIG. 2 described in the first embodiment.

(7) Also, in the modification example (6), the verifying step may comprise: an acquiring step of acquiring, as verification information, a value stored at a predetermined memory address in the information processing device; and a judging step of judging whether the information processing device is legitimate based on the acquired verification information.

Here, the "acquiring step" corresponds with the processing in S301 and S304 shown in FIG. 3 described in the first embodiment.

Also, the "judging step" corresponds with, for example, the processing described in (Legitimacy Verification of Execution Environment Including Virtual Machine) of the first embodiment, as follows: "The virtual machine code 121 acquires the returned verification information (S304), verifies the verification information and the verification value 403 based on the verification rule 404, and passes a result of the verification to S205 of FIG. 2. In this example, the verification result is positive if the verification information is 0xed, and is otherwise negative."

(8) Also, in the modification example (7), the storage medium may further have stored thereon a playback-related program that is executed on the virtual machine and includes a processing procedure that relates to the playback of the contents, and the verification method may further comprise a suppressing unit operable to, if the information processing device is illegitimate, suppress the execution of the processing procedure.

Here, the "playback-related program that is executed on the virtual machine and includes a processing procedure that relates to the playback of the contents" corresponds with the command program 811, the clip file related information 812, the clip file 813, the verification-use code 814, the secret information-use code 81S, and the restoration information file 816, which are described in the second embodiment using FIG. 8.

Figure 10:
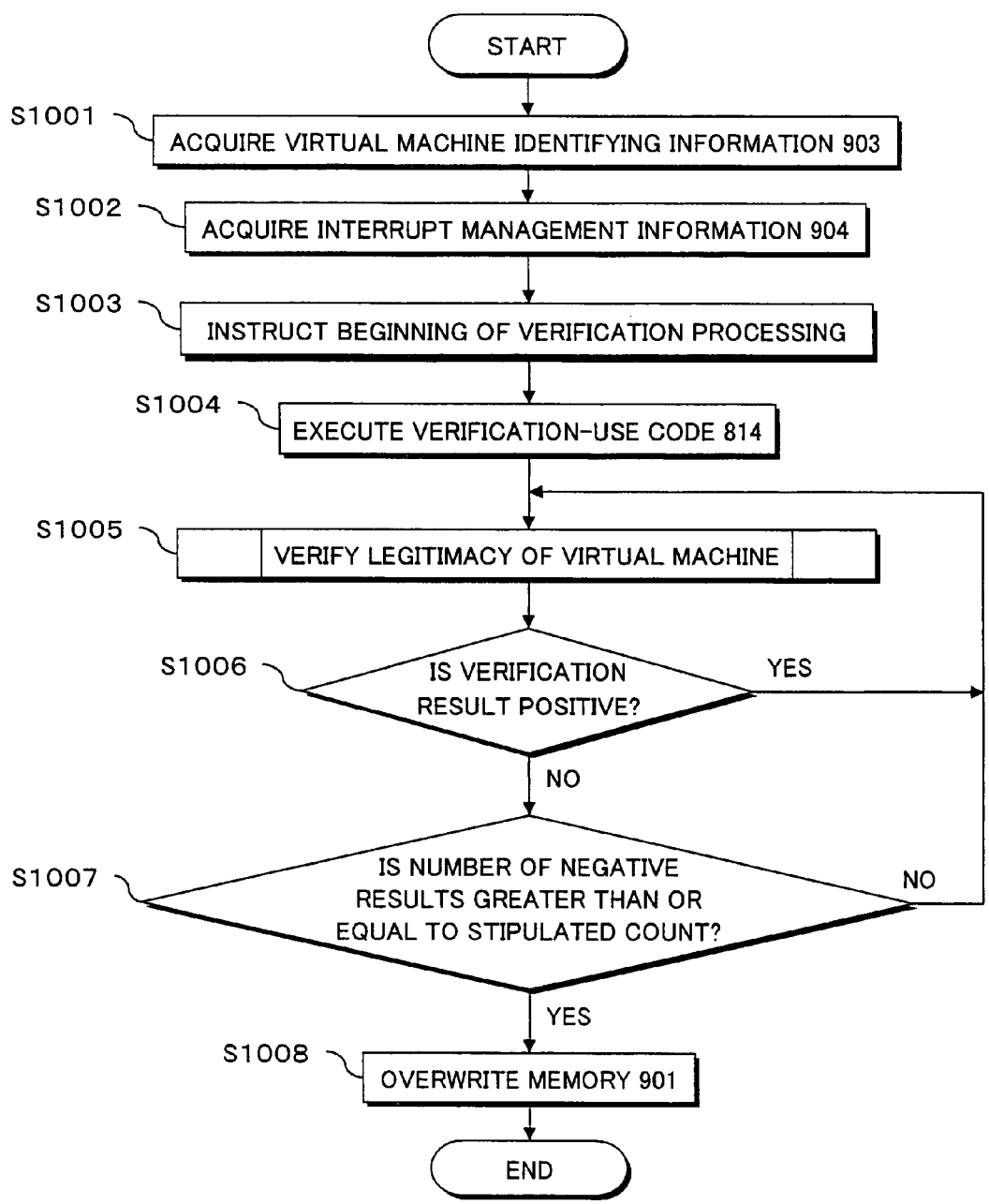
FIG. 10 is a flowchart of processing for verifying legitimacy of an execution environment including a virtual machine in the second embodiment.

Also, the "suppressing step" corresponds with the case where the verification result is positive in S1006 of FIG. 10 and the processing in S1008 described in the second embodiment.

(9) Also, in the modification example (8), the contents may be transformed so as to be restored by executing a predetermined restoration processing, the processing procedure may include a procedure of restoring the transformed contents by executing the restoration processing, and the suppressing step may suppress the execution of the restoration processing.

Here, the "predetermined restoration processing" and the "procedure of restoring the transformed contents by executing the restoration processing" correspond with the processing described in (Restoration Processing) of the second embodiment. For example, the "predetermined restoration processing" and the "procedure of restoring the transformed contents by executing the restoration processing" correspond with the processing performed by the secret information-use code 815, the presentation processing unit 831, and the restoration processing unit 832.

Also, the description "the suppressing step may suppress the execution of the restoration processing" corresponds with the processing described in (Restoration Processing) of the second embodiment, as follows: "As described above, it is possible to restore transformed content data, and to play it back normally. Accordingly, when the result of the above verification processing is negative for instance, it is possible, by overwriting a part or all of the region of the memory 901, to render the secret information calculating unit 830 incapable of acquiring correct secret information, making normal playback impossible."

(10) Also, in the modification example (7), the verification information may be information that changes in accordance with a timing.

Here, the "information that changes in accordance with a timing" especially corresponds with the following description in (3) Time Dependent Information in (Example of Verification Rule) of the first embodiment: "Virtually any time varying information can be used in the verification processing in this way."

(11) Also, in the modification example (7), the verification information may be information that relates to the contents that are played back.

Here, the "information that relates to the contents that are played back" especially corresponds with the description in (1) Information Relating to Content in (Example of Verification Rule) of the first embodiment.

(12) Also, in the modification example (7), the verification information may be information that depends on an execution environment including the virtual machine.

Here, the "information that depends on an execution environment including the virtual machine" corresponds with the description in (2) Information Dependent on Execution Environment Including Virtual Machine in (Example of Verification Rule) of the first embodiment.

(13) Also, in the modification example (7), the storage medium may further have stored thereon one or more verification values and on or more verification rules in correspondence, the judging step may comprise a comparing step of comparing the verification information with one of the stored verification values based on one of the verification rules that corresponds to the verification value, and if a result of the comparison satisfies the verification rule, the judging step may judge that the information processing device is legitimate.

Here, the "verification value" corresponds with the verification value 403 described in the first embodiment using FIG. 5.

Also, the "verification rule" corresponds with the verification rule 404.

Also, the "comparing step" and the "judging step" correspond with the processing described in (Legitimacy Verification of Execution Environment Including Virtual Machine) of the first embodiment, as follows: "The virtual machine code 121 acquires the returned verification information (S304), verifies the verification information and the verification value 403 based on the verification rule 404, and passes a result of the verification to S205 of FIG. 2. In this example, the verification result is positive if the verification information is 0xed, and is otherwise negative."

(14) Also, in the modification example (13), the acquiring step may comprise a requesting step of making a request for a value stored at the predetermined memory address at a verification timing, the verification method may further comprise a returning step of reading the stored value in response to the request, and returning the read value as the verification information to the verification program, the acquiring step may acquire the returned value as the verification information, and the comparing step may perform the comparison using the acquired verification information.

Here, the "requesting step" corresponds with the processing in S301 shown in FIG. 3 described in the first embodiment.

Also, the "returning step" corresponds with the processing in S303 shown in FIG. 3 described in the first embodiment.

(15) Also, in the modification example (13), the storage medium may further have stored thereon the verification values and one or more verification timings in correspondence, the comparing step may perform the comparison using the verification information acquired at one of the verification timings, the verification value corresponding to the verification timing, and the verification rule corresponding to the verification timing, the judging step may further comprise: a repeating step of repeating execution of the comparing step at each of the verification timings; and a determining step of determining the information processing device as illegitimate if a count of negative results of the repetition is no less than a predetermined value.

Here, the "verification timing" corresponds with the verification timing 402 shown in FIG. 5 described in the first embodiment.

Also, the "repeating step" especially corresponds with the processing in S203: YES, S204, S205: YES, S207: NO, and S208: NO described in the first embodiment.

Also, the "determining step" corresponds with the processing in the processing in S208: YES.

(16) Also, in the modification example (13), the storage medium may further have stored thereon the verification values and pieces of identifying information that each uniquely identifies the virtual machine in correspondence, and the comparing step may perform the comparison using one of the verification value corresponding to one piece of the identifying information identifying the virtual machine included in the information processing device.

Here, the "identifying information" corresponds with the virtual machine identifying information 117 shown in FIG. 5 described in the first embodiment.

(17) Also, in the modification example (7), the storage medium may further have stored thereon one or more verification timings and one or more verification rules in correspondence, the information processing device may further comprise a storing unit that stores, as information for comparison, a value stored at the predetermined memory address at a predetermined timing, the acquiring step may acquire a value stored at the predetermined memory address at one of the verification timings, the judging step may comprise a comparing step of comparing the verification information with the stored information for comparison based on one of the verification rules that corresponds to the verification timing, and the judging step may perform the judgment based on a result of the comparison.

(18) Also, in the modification example (17), the acquiring step may comprise a requesting step of making a request for the value stored at the verification timing, the verification method may further comprise a returning step of reading the stored value in response to the request, and returning the read value as the verification information to the verification program, the acquiring step may acquire the returned value as the verification information, and the comparing step may perform the comparison using the acquired verification information.

Here, the "storing unit" corresponds, for example, with the following description in (2) Information Dependent on Execution Environment Including Virtual Machine in (Example of Verification Rule) of the first embodiment: "Then, as shown in the verification rule table 500 of FIG. 5 stored in the verification information storing module 1122, when a disc is inserted, the execution environment including the virtual machine is made to generate a random number and to store the random number at the address 0x00aa0010."

Also, the "acquiring step", the "comparing step", and the "judging step" are based on the following description in (2) Information Dependent on Execution Environment Including Virtual Machine in (Example of Verification Rule) of the first embodiment: "Subsequently, at the beginning of playback or upon a user operation, the execution environment is made to generate and store a random number at the address 0x00aa0010 again. The virtual machine code 121 acquires this newly generated random number, compares it with the previously stored random number, and if the new value is different, gives a positive verification."

Also, the "requiring step" corresponds with the processing in S301 shown in FIG. 3 described in the first embodiment.

Also, the "returning step" corresponds with the processing in S303 shown in FIG. 3 described in the first embodiment.

(19) Also, in the modification example (17), the information processing device may further comprise a random number generating unit operable to generate a random number, the verification method may comprise a random number storing step of causing the random number generating unit to generate a random number at each of the verification timings and store the generated random number at the predetermined address, the acquiring step may perform the acquisition of the verification information by reading the stored random number at the verification timing, and if the verification information differs from the comparison information in the comparison, the judging step may judge the information processing device as legitimate.

Here, the "random number generating unit" corresponds with the random number generating unit 601 shown in FIG. 6 described in the first embodiment.

Also, the "random number storing step" and the "judging step" correspond with the following descriptions in (2) Information Dependent on Execution Environment Including Virtual Machine in (Example of Verification Rule) of the first embodiment: "Then, as shown in the verification rule table 500 of FIG. 5 stored in the verification information storing module 1122, when a disc is inserted, the execution environment including the virtual machine is made to generate a random number and to store the random number at the address 0x00aa0010." and "Subsequently, at the beginning of playback or upon a user operation, the execution environment is made to generate and store a random number at the address 0x00aa0010 again. The virtual machine code 121 acquires this newly generated random number, compares it with the previously stored random number, and if the new value is different, gives a positive verification."

(20) Also, in the modification example (19), the random number generating unit may perform the generation based on information that depends on the execution environment including the virtual machine.

Here, the "random number generating unit" corresponds with, for example, the following description in (2) Information Dependent on Execution Environment Including Virtual Machine in (Example of Verification Rule) of the first embodiment: "Note that choosing a value, such as an address or the virtual machine identifying information 117, which differs for each execution environment including a virtual machine as a seed for the random number will reduce the chances of generating the same random number."

(21) Also, in the modification example (17), the information processing device may further comprise a clock unit operable to clock a time and write the time to the predetermined memory address, the storing unit may store the time written at the predetermined timing as the information for comparison, the acquiring step may perform the acquisition of the verification information by reading the written time at the verification timing, if the time shown by the verification information is greater than the time shown by the information for comparison in the comparison, the judging step may judge the information processing device as legitimate.

Here, the "clock unit" corresponds with the clock unit 701 shown in FIG. 7 described in the first embodiment.

Also, the "storing unit", the "acquiring step", and the "judging step" correspond with, for example, the following description in (3) Time Dependent Information in (Example of Verification Rule) of the first embodiment: "Then, as indicated in the verification rule table 500 of FIG. 5, which is stored in the verification information storing module 1122, when a disc is inserted, the virtual machine code 121 acquires a value for the current time from 0x00eee002, and stores the value. Then, when a clip file is switched, the virtual machine code acquires a value for the current time from the same address, compares it with the previously stored value, and if the value for the current time is greater than the stored value gives a positive verification."

(22) Also, the present invention is an information processing device that executes processing relating to playback of contents stored on a storage medium and includes therein a virtual machine, wherein the storage medium has stored thereon a verification program that verifies legitimacy of the information processing device by being executed on the virtual machine, and the information processing device comprises: a reading unit operable to read the verification program from the storage medium; a receiving unit operable to receive, from the verification program, a request for a value stored at the verification timing at a predetermined memory address in the information processing device; and a returning unit operable to, upon receiving the request, read the stored value and return the read value to the verification program.

Also, the present invention is an integrated circuit implemented in an information processing device that executes processing relating to playback of contents stored on a storage medium and includes therein a virtual machine, wherein the storage medium has stored thereon a verification program that verifies legitimacy of the information processing device by being executed on the virtual machine, and the integrated circuit comprises: a reading unit operable to read the verification program from the storage medium; a receiving unit operable to receive, from the verification program, a request for a value stored at a predetermined memory address in the information processing device at the verification timing; and a returning unit operable to, upon receiving the request, read the stored value and return the read value to the verification program.

Here, the "verification program" corresponds with the virtual machine verifying module 1121 shown in FIG. 1.

Also, the "reading unit" corresponds with the disc reading unit 111 shown in FIG. 1.

Also, the "receiving unit" and the "returning unit" are realized by the virtual machine executing unit 113 reading, decoding, and executing command codes included in the virtual machine executing code 115.

Also, the present invention is a storage medium having stored thereon a verification program that executes processing relating to playback of contents and verifies legitimacy of an information processing device including therein a virtual machine, wherein the verification program comprises: an acquiring step of acquiring, as verification information, a value stored at a predetermined memory address in the information processing device; and a judging step of judging whether the information processing device is legitimate based on the acquired verification information.

Also, the present invention is a verification program that causes an information processing device including therein a virtual machine to verify legitimacy of the information processing device, the information processing device executing processing relating to playback of contents stored on a storage medium, the verification program comprising: an acquiring step of acquiring, as verification information, a value stored at a predetermined memory address in the information processing device; and a judging step of judging whether the information processing device is legitimate based on the acquired verification information.

Here, the "acquiring step" corresponds with the processing in S301 and S304 shown in FIG. 3 described in the first embodiment.

Also, the "judging step" corresponds with, for example, the following description in (Legitimacy Verification of Execution Environment Including Virtual Machine) of the first embodiment: "The virtual machine code 121 acquires the returned verification information (S304), verifies the verification information and the verification value 403 based on the verification rule 404, and passes a result of the verification to S205 of FIG. 2. In this example, the verification result is positive if the verification information is Oxed, and is otherwise negative."

(23) Also, the present invention may have the following structure.

(23-1) The present invention is an information processing method for executing a virtual machine code using a virtual machine, the information processing method comprising a verifying steps of verifying legitimacy of an execution environment including the virtual machine using the virtual machine code; and a suspending step of suspending processing of the virtual machine if the execution environment is judged to be illegitimate in the verification step.

(23-2) In the information processing method in the modification example (23-1), the verifying step may comprise: an acquiring step of acquiring information stored in the execution environment; a providing step of causing the virtual machine to provide the virtual machine code with the information; and a verifying step of causing the virtual machine code to compare the information with verification information stored in the virtual machine, and verify legitimacy of the virtual machine based on a rule stipulated in the virtual machine.

(23-3) Also, in the modification example (23-2), the "information" may be information that relates to content processed in the execution environment including the virtual machine.

(23-4) Also, in the modification example (23-2), the "information" may be information that depends on the execution environment including the virtual machine.

(23-5) Also, in the modification example (23-2), the "information" may be information that dynamically transforms depending on a status of the execution environment including the virtual machine or a status of contents.

(23-6) Also, the present invention is a program that causes a computer to execute one of the steps included in the information processing method described in any of the modification examples (23-1) to (23-5).

(23-7) Also, the present invention is a computer readable storage medium having stored therein a program that causes a computer to execute one of the steps included in the information processing method described in any of the modification examples (23-1) to (23-5).

The information processing device of the present invention, which uses a virtual machine to execute programs without depending on a platform, is effective in cases that demand security in programs that operate on the virtual machine, such as a program for copyright protection.

The invention claimed is:

1. A verification method used in an information processing device that executes processing relating to playback of contents by using a virtual machine included therein, the verification method using a storage medium having content, a verification program, and a verification rule table in correspondence with each other stored thereon, the verification rule table including one verified address range and one verification rule in correspondence with each other, the verified address range indicating a range of a memory address of a memory in the information processing device, the verification rule indicating whether verification succeeds by judging whether data held on a storage position in the information processing device indicated by the verified address range corresponding to the verification rule includes a value equivalent to property information of a file constituting the content, and the information processing device holding the property information on the storage position indicated by the verified address range, the verification rule table further including verification values in a one to one correspondences with verification rules and further includes verification timings in a one-to-one correspondence with the verification values, said verification method comprising:

reading the content, the verification program, and the verification rule table stored on the storage medium;

verifying, by using the virtual machine executing the verification program, legitimacy of the information processing device including the virtual machine; and suppressing playback of the content when a result of the verification indicates that the information processing device is illegitimate, said verifying comprising:

generating a random number at each of the verification timings and storing the generated random number at a predetermined address;

acquiring, by the verification program, a value held at the memory address indicated by the verified address range in the information processing device;

further acquiring, by the verification program, verification information by reading the stored random number at the verification timing;

judging, whether the held property information and the value acquired from the memory address indicated by the verified address range in the information processing device satisfy the verification rule corresponding to the verified address range, further judging, whether the random number differs from a comparison of the stored random number in order to determine the information processing device as legitimate;

said verifying judges that the information processing device is legitimate by judging that the verification rule is satisfied.

2. The verification method of claim 1, wherein the verified address range is one of one or more verified address ranges and the verification rule is one of one or more verification rules in the verification rule table, and the one or more verified address ranges and one or more verification rules are in a one-to-one correspondence.

3. The verification method of claim 2, wherein the verification rule table further includes verification values in a one-to-one correspondence with the verification rules, each one of the verification rules indicates whether the verification succeeds by judging whether the value stored on the storage position is equivalent to one of the verification values corresponding to a respective one of the verification rules, said judging comprises comparing the verification information with one of the verification values based on the corresponding verification rules, and when a result of the comparison satisfies the verification rule, said judging includes judging that the information processing device is legitimate.

4. The verification method of claim 3, wherein said acquiring comprises requesting the value held at the memory address in accordance with a verification timing, the verification method further comprises reading the held value in response to the request, and returning the read value as the verification information to the verification program, said acquiring includes acquiring the returned value as the verification information, and said comparing includes performing the comparison using the acquired verification information.

5. The verification method of claim 3, wherein the verification rule table further includes verification timings in a one-to-one correspondence with the verification values, said comparing includes performing the comparison using the verification information acquired in accordance with one of the verification timings, the verification value corresponding to the verification timing, and the verification rule corresponding to the verification timing, said judging further comprises:

repeating execution of said comparing in accordance with each of the verification timings; and determining the information processing as illegitimate if a count of negative results of the repetition is no less than a predetermined value.

6. The verification method of claim 2, wherein the verification rule table further includes pieces of identifying information in a one-to-one correspondence with the verification values, the pieces of identifying information each uniquely identifying the virtual machine, and said comparing includes performing the comparison using one of the verification values corresponding to one piece of the identifying information.

7. The verification method of claim 2, wherein the verification rule table further includes verification timings in a one-to-one correspondence with the verification rules, the information processing device further comprises a storing unit that stores the held value as information for comparison in accordance with a predetermined timing, said acquiring includes acquiring the held value as the verification information in accordance with one of the verification timings, said judging comprises comparing the verification information with the stored information for comparison based on one of the verification rules that corresponds to the verification timing, and said judging includes performing the judgment based on a result of the comparison.

8. The verification method of claim 7, wherein said acquiring comprises' requesting the held value in accordance with the verification timing, the verification method further comprises reading the held value in response to the request, and returning the read value as the verification information to the verification program, said acquiring includes acquiring the returned value as the verification information, and said comparing includes performing the comparison using the acquired verification information.

9. The verification method of claim 7, wherein the information processing device further comprises a random number generating unit operable to generate a random number, the verification method comprises causing the random number generating unit to generate a random number and hold the generated random number at the address, said acquiring includes performing the acquisition of the verification information by reading the held random number in accordance with the verification timing, and if the verification information differs from the comparison information in the comparison, said judging judges the information processing device as legitimate.

10. The verification method of claim 9, wherein the random number generating unit performs the generation based on information that depends on the execution environment including the virtual machine.

11. The verification method of claim 7, wherein the information processing device further comprises a clock unit operable to clock a time and write the time to the memory address, the storing unit stores the written time as the information for comparison in accordance with the predetermined timing, said acquiring includes performing the acquisition of the verification information by reading the written time in accordance with the verification timing, and if the time shown by the verification information is greater than the time shown by the information for comparison in the comparison, said judging includes judging the information processing device as legitimate.

12. The verification method of claim 2, wherein the property information is one of (i) a size or a time stamp of an index file, (ii) a size or a time stamp of a navigation file of the content, and (iii) a size or a time stamp of a file relating to the content.

13. The verification method of claim 2, wherein when the value stored on the storage position is equivalent to one of a number of play lists stored on the storage medium and a number of play items stored on the storage medium, the verification rule indicates that the verification succeeds, and said judging judges whether the acquired verification information and one of the number of play lists and the number of play items Satisfy the verification rule.

14. The verification method of claim 2, wherein when the value stored on the storage position is equivalent to at least part of a hash table of the content stored in the storage medium, the verification rule indicates that the verification succeeds, and said judging judges whether the at least part of the hash table and the acquired verification information satisfy the verification rule.

15. The verification method of claim 1, wherein said verifying comprising:

requesting the virtual machine to control the verification program executed by the virtual machine to acquire the value held at the memory address indicated by the verified address range;

acquiring, by the virtual machine, in response to the request, the value held at the memory address indicated by the verified address range; providing, by the virtual machine, the verification program with the acquired value;

and judging whether the held property information and the acquired value satisfy the verification rule corresponding to the verified address range.

16. An information processing device that executes processing relating to playback of contents stored on a storage medium and includes therein a virtual machine, the storage medium having content, a verification program, and a verification rule table in correspondence with each other stored thereon, the verification rule table including one verified address range and one verification rule in correspondence with each other, the verified address range indicating a range of a memory address of a memory in the information processing device, the verification rule indicating whether verification succeeds by judging whether data held on a storage position indicated by the verified address range corresponding to the verification rule includes a value equivalent to property information of a file constituting the content, the information processing device holding the property information on the storage position in the information processing device indicated by the verified address range, and the verification program verifying legitimacy of the information processing device by being executed on the virtual machine, the verification rule table further including verification values in a one to one correspondences with verification rules and further includes verification timings in a one-to-one correspondence with the verification values, the information processing device comprising:

a reading unit operable to read the content, the verification program, and the verification rule table stored on the storage medium;

a receiving unit operable to receive, from the verification program, a request for a value held in accordance with verification timing at the memory address in the information processing device;

a returning unit operable to, upon receiving the request, read the held value and return the read value to the verification program; and a suppressing unit operable to suppress playback of the content when a result of the verification indicates that the information processing device is illegitimate, wherein the verification program is operable to:

generating a random number at each of the verification timings and storing the generated random number at a predetermined address;

acquire a value held at the memory address indicated by the verified address range in the information processing device;

further acquiring, by the verification program, verification information by reading the stored random number at the verification timing;

judge whether the held property information and the value acquired from the memory address indicated by the verified address range in the information processing device satisfy the Verification rule corresponding to the verified address range; and further judging, whether the random number differs from a comparison of the stored random number in order to determine the information processing device as legitimate;

judge that the information processing device is legitimate by judging that the verification rule is satisfied.

17. An integrated circuit implemented in an information processing device that executes processing relating to playback of contents stored on a storage medium and includes therein a virtual machine, the storage medium having content, a verification program, and a verification rule table in correspondence with each other stored thereon, the verification rule table including one verified address range and one verification rule in correspondence with each other, the verified address range indicating a range of a memory address of a memory in the information processing device, the verification rule indicating whether verification succeeds by judging whether data held on a storage position indicated by the verified address range corresponding to the verification rule includes a value equivalent to property information of a file constituting the content, the information processing device holding the property information on the storage position in the information processing device indicated by the verified address range, and the verification program that verifying legitimacy of the information processing device by being executed on the virtual machine, the verification rule table further including verification values in a one to one correspondences with verification rules and further includes verification timings in a one-to-one correspondence with the verification values, the integrated circuit comprising:

a reading unit operable to read the content, the verification program, and the verification rule table stored on the storage medium;

a receiving unit operable to receive, from the verification program, a request for a value held at the memory address in the information processing device in accordance with verification timing; and a returning unit operable to, upon receiving the request, read the held value and return the read value to the verification program; and a suppressing unit operable to suppress playback of the content when a result of the verification indicates that the information processing device is illegitimate, wherein the verification program is operable to:

generating a random number at each of the verification timings and storing the generated random number at a predetermined address;

acquire a value held at the memory address indicated by the verified address range in the information processing device;

further acquiring, by the verification program, verification information by reading the stored random number at the verification timing;

judge whether the held property information and the value acquired from the memory address indicated by the verified address range in the information processing device satisfy the Verification rule corresponding to the verified address range; and further judging, whether the random number differs from a comparison of the stored random number in order to determine the information processing device as legitimate;

judge that the information processing device is legitimate by judging that the verification rule is satisfied.

18. A non-transitory storage medium having stored thereon a verification program that executes processing relating to playback of contents and verifies legitimacy of an information processing device including therein a virtual machine, the storage medium including content, a verification program, and a verification rule table in correspondence with each other stored thereon, the verification rule table including one verified address range and one verification rule in correspondence with each other, the verified address range indicating a range of a memory address of a memory in the information processing device, the verification rule indicating whether verification succeeds by judging whether data held on a storage position indicated by the verified address range corresponding to the verification rule includes a value equivalent to property information of a file constituting the content, and the information processing device holding the property information on the storage position in the information processing device indicated by the verified address range, the verification rule table further including verification values in a one to one correspondences with verification rules and further includes verification timings in a one-to-one correspondence with the verification values, wherein the verification program comprises:

generating a random number at each of the verification timings and storing the generated random number at a predetermined address;

acquiring, by the verification program, a value held at the memory address indicated by the verified address range in the information processing device;

further acquiring, by the verification program, verification information by reading the stored random number at the verification timing;

judging, whether the held property information and the value acquired from the memory address indicated by the verified address range in the information processing device satisfy the verification rule corresponding to the verified address range, further judging, whether the random number differs from a comparison of the stored random number in order to determine the information processing device as legitimate;

wherein the information processing device is judged to be legitimate by judging that the verification rule is satisfied.

19. A verification method used in an information processing device that executes processing relating to playback of contents by using a virtual machine included therein, the verification method using a storage medium having content, a verification program, and a verification rule table in correspondence with each other stored thereon, the verification rule table including one verified address range and one verification rule in correspondence with each other, the verified address range indicating a range of a memory address of a memory in the information processing device, the verification rule indicating whether verification succeeds by judging whether data held on a storage position in the information processing device indicated by the verified address range corresponding to the verification rule includes a value equivalent to property information of a clip related information file constituting the content, and the information processing device holding the property information on the storage position indicated by the verified address range, the verification rule table further including verification values in a one to one correspondences with verification rules and further includes verification timings in a one-to-one correspondence with the verification values, said verification method comprising:

reading the content, the verification program, and the verification rule table stored on the storage medium;

verifying, by using the virtual machine executing the verification program, legitimacy of the information processing device including the virtual machine; and suppressing playback of the content when a result of the verification indicates that the information processing device is illegitimate, said verifying comprising:

generating a random number at each of the verification timings and storing the generated random number at a predetermined address;

acquiring, by the verification program, a value held at the memory address indicated by the verified address range in the information processing device;

further acquiring, by the verification program, verification information by reading the stored random number at the verification timing;

judging, whether the held property information and the value acquired from the memory address indicated by the verified address range in the information processing device satisfy the verification rule corresponding to the verified address range, wherein further judging, whether the random number differs from a comparison of the stored random number in order to determine the information processing device as legitimate;

said verifying judges that the information processing device is legitimate by judging that the verification rule is satisfied.

20. The verification method of claim 19, wherein the property information of the clip related information file describes one of a clip file attribute, a time search map, a play list and a play item.

* * * * *